United States Patent [19]
Yumoto et al.

[11] Patent Number: 5,758,082
[45] Date of Patent: May 26, 1998

[54] MAIL TERMINAL EQUIPMENT

[75] Inventors: Kazuma Yumoto, Hachioji; Naoko Iwami, Machida; Tohru Hoshi, Yokohama; Toshiaki Koyama, Zama, all of Japan

[73] Assignee: Hitachi, Ltd., Tokyo, Japan

[21] Appl. No.: 665,951

[22] Filed: Jun. 19, 1996

[30] Foreign Application Priority Data

Jun. 20, 1995 [JP] Japan ................................. 7-153411

[51] Int. Cl.⁶ ...................................................... G06F 17/00
[52] U.S. Cl. ................................................... 395/200.49
[58] Field of Search ..................... 395/200.49, 200.36; 345/434, 326, 329; 348/511, 512, 515

[56] References Cited

U.S. PATENT DOCUMENTS

| | | | |
|---|---|---|---|
| 5,420,801 | 5/1995 | Dockter et al. | 345/326 |
| 5,497,373 | 3/1996 | Hulen et al. | 348/13 |
| 5,661,665 | 8/1997 | Glass et al. | 348/511 |
| 5,680,639 | 10/1997 | Milne et al. | 345/329 |

*Primary Examiner*—Ellis B. Ramirez
*Attorney, Agent, or Firm*—Antonelli, Terry, Stout & Kraus, LLP

[57] ABSTRACT

In mail terminal equipment for receiving and reproducing a mail which has been produced using multi-media data containing a plurality of continuous audio data and a plurality of drawing data synchronized with at least a part of the audio data and has been transmitted thereto. Where reproduction of the drawing data is later than that if the audio data, the drawing data is synchronized with the audio data without interrupting reproduction of the audio data. When the drawing data still remains which at certain timing (e.g., timing when supplementing the audio data to a audio buffer for storing the audio data waiting for reproduction), should be reproduced until that time point, but is not reproduced resulting from the delay of reproduction of the drawing data due to the drawing processing, the loading situation and the like, the drawing data of interest is skipped so as not to be reproduced, and the next drawing data is reproduced.

46 Claims, 21 Drawing Sheets

- ● : DRAWING DATA TO BE REPRODUCED
- ○ : DRAWING DATA NOT TO BE REPRODUCED

| TIME | NUMBER OF PROCESSINGS |
|---|---|
| from T0 to T1 | D1 |
| from T1 to T2 | D2 |
| from T2 to T3 | D3 |
| LIMIT VALUE | Max ( D1 , D2 , D3 ) |

100f (rows 1-3), 100g (LIMIT VALUE row)

● : DRAWING DATA TO BE REPRODUCED

○ : DRAWING DATA NOT TO BE REPRODUCED

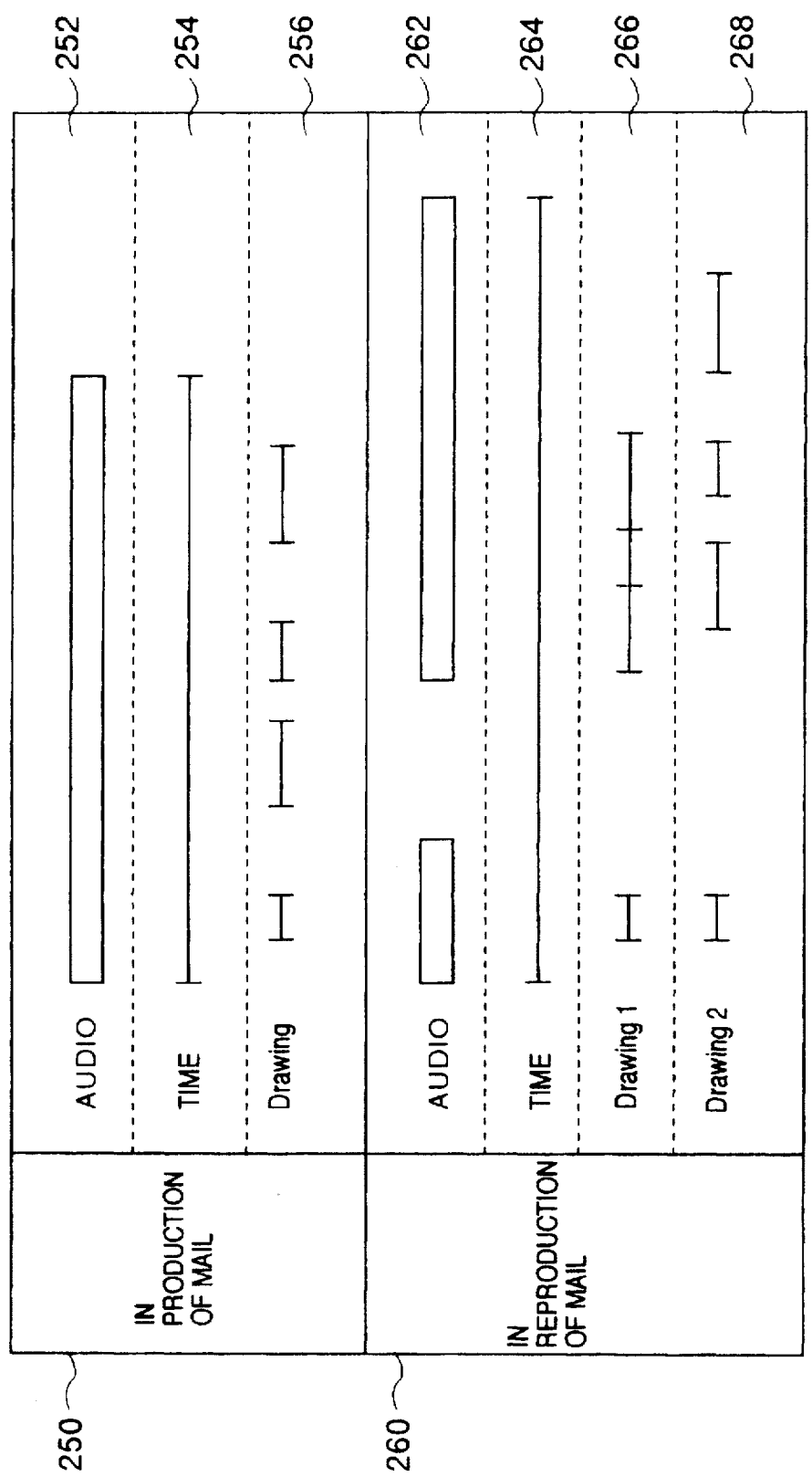

MAIL TERMINAL EQUIPMENT

CROSS-REFERENCE TO RELATED APPLICATION

This application relates to a U.S. application Ser. No. 08/666,634 filed, on Jan. 18, 1996 entitled "DATA COMMUNICATION METHOD, DATA COMMUNICATIONS TERMINAL, AND DATA COMMUNICATIONS SYSTEM" and assigned to the present assignee, based on the Japanese Patent Application No. 07-152944 filed on Jun. 20, 1995.

BACKGROUND OF THE INVENTION

The present invention relates to a multi-media mail system which has a plurality of terminal equipments connected to one another through a network and which is capable of carrying out transmission/reception of a mail, which has been produced using multi-media data containing a plurality of continuous audio data and a plurality of drawing data synchronized with at least a part of the audio data, between the plurality of terminal equipments. More particularly, the invention concerns the system technology in which even when the terminal equipment which receives and reproduces the mail is inferior in drawing processing performance to the terminal equipment which produces and transmits the mail, the audio data is synchronized with the drawing data in order to make reproduction of the mail possible without interrupting reproduction of the audio data.

Conventionally, in an electronic mail system which has a plurality of terminal equipments connected to one another through a network and which carries out transmission/reception of the mail between the plurality of terminal equipments, the text data is mainly processed. That is, the mail transmission/reception of which is carried out between the plurality of terminal equipments is produced using a plurality of text data.

In addition, in an electronic mail system as well which can treat the data, other than the text data, such as audio data and drawing data, the audio data and the drawing data are processed independently of and asynchronously with the text data. For example, the mail which is produced using a plurality of audio data, or the mail which is produced using a plurality of drawing data is processed as a mail belonging to the mail which is produced using a plurality of text data. Then, the user reproduces such appended mail as may be necessary.

Now, in the terminal equipment having a high drawing processing speed, it is possible to process the multi-media data containing a plurality of audio data and a plurality of image data. Therefore, it can be considered that such terminal equipment is connected to one another through a network, whereby a multi-media mail system is constructed which can transmit/receive the mail produced using the multi-media data.

However, the drawing processing speeds of all the terminal equipment connected to one another through the network are not necessarily identical to one another. Therefore, in the case where the drawing processing speed of the terminal equipment which receives and reproduces the mail is slower than that of the terminal equipment which has produced and transmitted the mail, or the drawing processing speed is too slow due to the application of the loads resulting from execution of other processings, in particular, when reproducing the mail which has been produced using the multimedia data containing a plurality of continuous audio data and a plurality of drawing data synchronous with at least a part of the audio data, reproduction of the drawing data is delayed than that of the audio data. As a result, the audio data can not be synchronized with the drawing data. This is a problem associated with the prior art.

SUMMARY OF THE INVENTION

It is therefore an object of the present invention to provide a terminal equipment which receives and reproduces a mail which has been produced using multi-media data containing a plurality of continuous audio data and a plurality of drawing data synchronous with at least a part of the audio data, the audio data being synchronized with the drawing data in order to make reproduction of the mail possible without interrupting reproduction of the audio data.

In order to attain the above-mentioned object, according to an aspect of the present invention, there is provided a mail terminal equipment for receiving and reproducing a mail, which has been produced using multi-media data containing a plurality of continuous audio data and a plurality of drawing data synchronous with at least a part of the audio data, and has been transmitted thereto, the equipment comprising:

(1) reception means for receiving a mail in which time information representing relative time elapsed from a time point when starting production of the mail is added to each of the plurality of drawing data;

(2) audio reproducing means for reproducing successively the plurality of audio data contained in the mail received by the reception means; and (3) drawing reproducing means for reproducing, when the relative time elapsed from a time point when starting reproduction of the mail reaches the time represented by the time information added to the drawing data of interest, the drawing data of interest if other drawing data is not being reproduced, and discarding the drawing data of interest if other drawing data is being reproduced, with respect to each of the plurality of drawing data contained in the mail received by the reception means.

In accordance with another aspect of the present invention, there is provided a mail terminal equipment for receiving and reproducing a mail, which has been produced using multi-media data containing a plurality of continuous audio data and a plurality of drawing data synchronous with at least a part of the audio data, and has been transmitted thereto, the equipment comprising:

(1) reception means for receiving a mail in which time information representing relative time elapsed from a time point when starting production of the mail is added to each of the plurality of drawing data;

(2) audio reproducing means for reproducing successively the plurality of audio data contained in the mail received by the reception means; and (3) drawing reproducing means for reproducing the drawing data, in order of reproduction, in which the relative time elapsed from a time point when starting reproduction of the mail reaches the time represented by the time information added to the drawing data, out of the plurality of drawing data contained in the mail received by the reception means, and discarding, whenever predetermined time elapsed, out of the drawing data which is still unreproduced at the associated time point, the drawing data of interest in which the relative time elapsed from a time point when starting reproduction of the mail reaches the time represented by the time information added to the drawing data of interest.

In accordance with a further aspect of the present invention, there is provided a mail terminal equipment for receiving and reproducing a mail, which has been produced using multi-media data containing a plurality of continuous audio data and a plurality of drawing data synchronous with at least a part of the audio data, and has been transmitted thereto, the equipment comprising:

(1) reception means for receiving a mail in which time information representing relative time elapsed from a time point when starting production of the mail is added to each of the plurality of drawing data;

(2) audio reproducing means for reproducing successively the plurality of audio data contained in the mail received by the reception means; and (3) drawing reproducing means for selecting a part of the plurality of drawing data contained in the mail received by the reception means, and reproducing, out of the selected drawing data, in order of reproduction, the drawing data in which the relative time elapsed from a time point when starting reproduction of the mail reaches the time represented by the time information added thereto.

Incidentally, the above-mentioned drawing reproducing means may be designed so as to discard, whenever predetermined time elapsed, out of the drawing data which is still unreproduced at the associated time point, the drawing data in which the relative time elapsed from a time point when starting reproduction of the mail reaches the time represented by the time information added thereto.

In the mail terminal equipment according to an aspect of the present invention, the drawing reproducing means reproduces, when the relative time elapsed from a time point when starting reproduction of the mail reaches the time represented by the time information added to the drawing data of interest, the drawing data of interest if other drawing data is not being reproduced, and discards the drawing data of interest if other drawing data is being reproduced, with respect to each of the plurality of drawing data contained in the mail received by the reception means. Therefore, even if reproduction of the drawing data by the drawing reproducing means becomes later than that of the audio data by the audio reproducing means, whenever reproducing one drawing data, the synchronization of the audio data with the drawing data can be recovered.

In addition, in the mail terminal equipment according to another aspect of the present invention, the drawing reproducing means reproduces the drawing data, in order of reproduction, in which the relative time elapsed from a time point when starting reproduction of the mail reaches the time represented by the time information added to the drawing data of interest, out of the plurality of drawing data contained in the mail received by the reception means, and discards, whenever predetermined time elapsed, out of the drawing data which is still unreproduced at the associated time point, the drawing data in which the relative time elapsed from a time point when starting reproduction of the mail reaches the time represented by the time information added thereto. Therefore, even if reproduction of the drawing data by the drawing reproducing means is later than that of the audio data by the audio reproducing means, the synchronization of the audio data with the drawing data can be recovered whenever the predetermined time elapsed.

Further, in the mail terminal equipment according to a further aspect of the present invention, the above-mentioned drawing reproducing means selects a part of the plurality of drawing data contained in the mail received by the reception means, and reproduces, out of the selected drawing data, in order of reproduction, the drawing data in which the relative time elapsed from a time point when starting reproduction of the mail reaches the time represented by the time information added thereto. Therefore, even if the drawing processing speed of the mail terminal equipment which receives and reproduces the mail is slower than that of the mail terminal equipment which has produced and transmitted the mail, the audio data can be synchronized with the drawing data.

For all that, if reproduction of the drawing data by the drawing reproducing means is still later than that of the audio data by the audio reproducing means, the above-mentioned drawing reproducing means may discard, whenever the predetermined time elapsed, out of the selected drawing which is still unreproduced at the associated time point, the drawing data in which the relative time elapsed from a time point when starting reproduction of the mail reaches the time represented by the time information added thereto..

Incidentally, the above-mentioned drawing reproducing means may judge, when the relative time elapsed from a time point when starting reproduction of the mail reaches the time represented by the time information added to the drawing data of interest, if other drawing data is being reproduced, whether the drawing data of interest should be reproduced or discarded, in correspondence to the time density of the drawing data which is still unreproduced at the associated time point, with respect to each of the plurality of drawing data contained in the mail received by the reception means. In this case, the synchronization of the audio data with the drawing data can be corrected whenever reproducing one drawing data.

Further, the mail terminal equipment of the present invention may include correction means for correcting relative time elapsed from a time point when starting reproduction of the mail, in correspondence to the total number of audio data reproduced by the audio reproducing means. In this case, even if reproduction of the audio data in interrupted, the synchronization of the audio data with the drawing data can be recovered again after reproduction of the audio data is resumed.

BRIEF DESCRIPTION OF THE DRAWINGS

Preferred embodiments of the present invention will be described in conjunction with the accompanying drawings, in which:

FIG. 23 is a schematic view showing the effects provided by a mail reproducing procedure of the fourth example.

DESCRIPTION OF THE PREFERRED EMBODIMENTS

The preferred embodiments of the present invention will hereinafter be described in detail with reference to the accompanying drawings.

Figure 1:
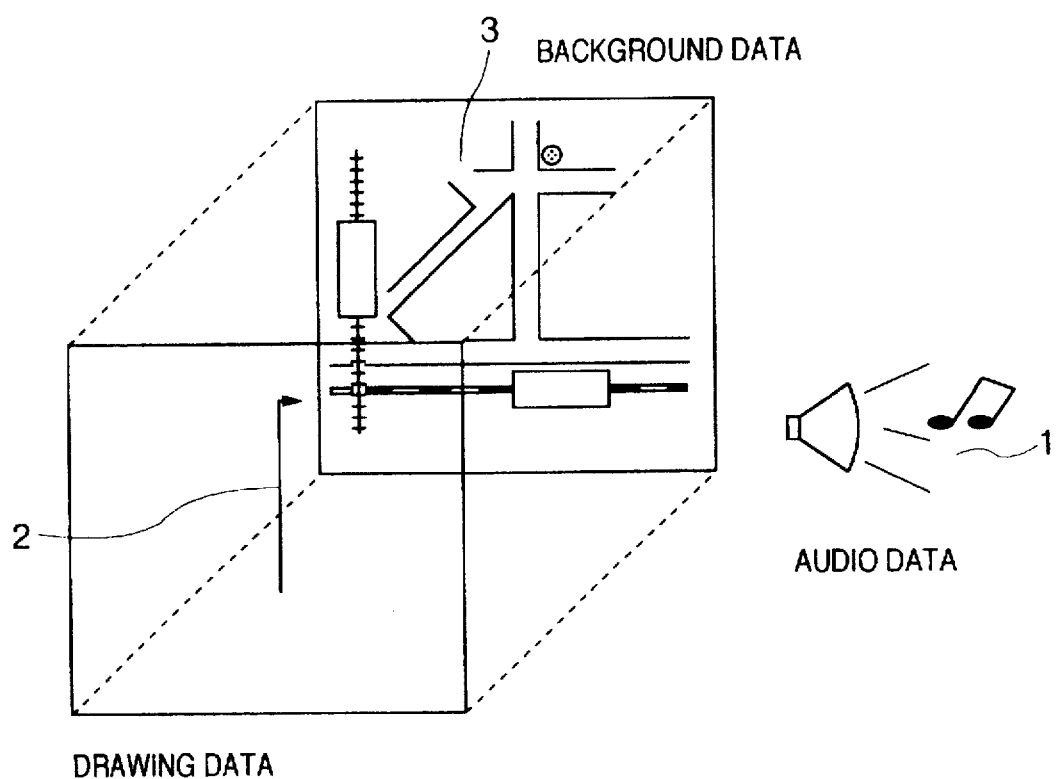
FIG. 1 is a schematic view useful in explaining the concept of ail.

In a multi-media mail system of an embodiment of present invention, transmission/reception of a mail as shown in FIG. 1, i.e., a mail obtained by adding instructions, notes, comments and the like to background data 3 as image data or text data such as documents is carried out between a plurality of terminal equipments using audio data 1 and drawing data 2. Even if a drawing processing speed of the terminal equipment which receives and reproduces the mail is slower than that of the terminal equipment which has produced and transmitted the mail, the audio data 1 can be synchronized with the drawing data 2 so as to reproduce the mail.

Figure 2:
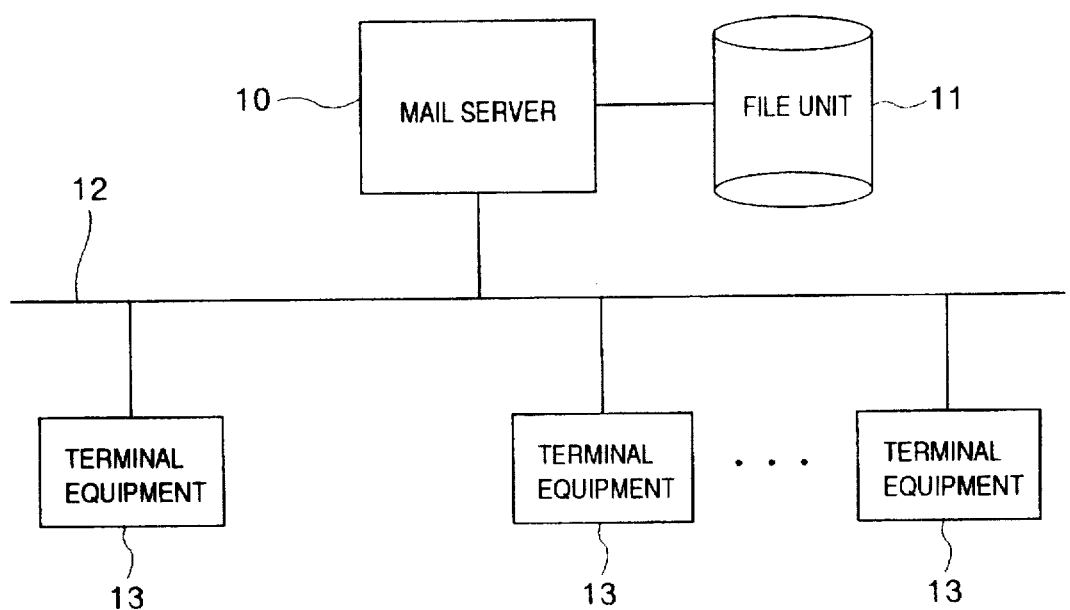
FIG. 2 is a block diagram showing a configuration of a multi-media mail system according to an embodiment of the present invention.

FIG. 2 shows a configuration of an example of the multi-media mail system according to the present embodiment.

As shown in FIG. 2, the multi-media mail system is designed in such a way that a plurality of terminal equipments 13 for carrying out production, transmission, reception and reproduction of the mail are connected to a mail server 10 including a file unit 11 for accumulating the mail through a network 12.

In transmission of the mail, after the terminal equipment 13 has added both destination information representing the terminal equipment 13 to which the mail should be transmitted and address information representing that terminal equipment 13 from which the mail should be transmitted to the produced mail, the terminal equipment 13 stores the resultant mail in the file unit 11 of the mail server 10 through the network 12.

On the other hand, in reception of the mail, the terminal equipment 13 reads out the mail to which the destination information representing that terminal equipment 13 is added from the file unit 11 of the mail server 10 through the network 12.

Figure 3:
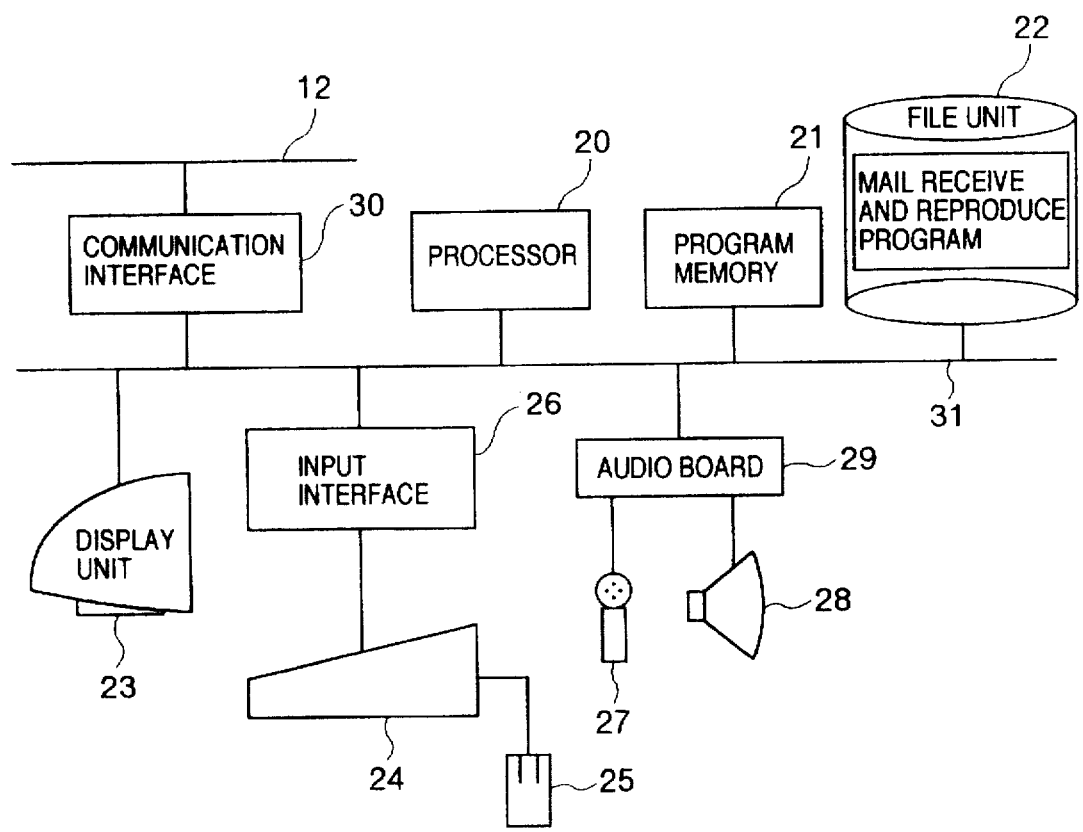
FIG. 3 is a block diagram showing a configuration of a terminal equipment of the present embodiment.

FIG. 3 shows a configuration of an example of the terminal equipment 13.

In FIG. 3, the terminal equipment 13 includes a communication interface 30 through which the terminal equipment 13 is connected to the network 12; a audio data input unit 27 for inputting therethrough the audio data (e.g., a microphone); a audio data output unit 28 for outputting therethrough the audio data (e.g., a speaker); a audio board 29 to which both the audio data input unit 27 and the audio data output unit 28 are connected and which serves to input therethrough the audio data as well as to reproduce the audio data; a text data input unit 24 which is connected to a bus 31 through an input interface 26 and which serves to input therethrough the text data (e.g., a keyboard); drawing data input unit 25 which is connected to the bus 31 through the input interface 26 and which serves to input therethrough the drawing data (e.g., a mouse); a display unit 23 for displaying both the text data and the drawing data (e.g., a CRT); a file unit 22 for storing various kinds of programs; a program memory 21 into which a program is loaded in execution of the program; and a processor 20 for executing a program, all of which are connected to one another through the bus 31.

Figure 4:
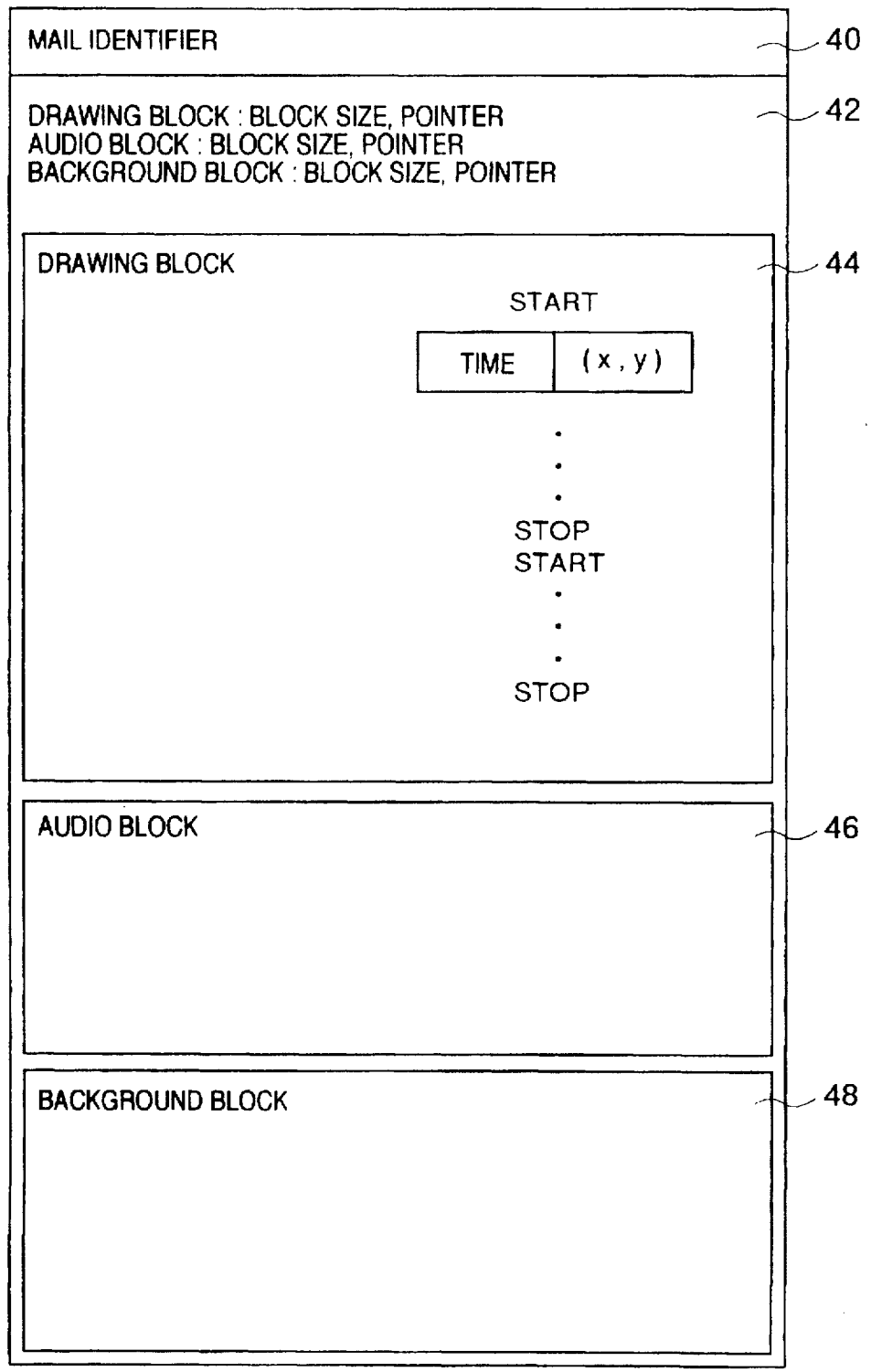
FIG. 4 is a schematic view useful in explaining a file structure of a mail in the present embodiment.

FIG. 4 schematically shows a file structure of a mail file which is transmitted and received as the mail in the multimedia mail system according to the present embodiment.

In FIG. 4, a mail identifier 40 containing both the destination information and the address information representing the terminal equipment from which the mail should be transmitted is added to a head portion of the mail.

The mail body has a structure in which a drawing block 44 consisting of a plurality of drawing data, a audio block 46 consisting of a plurality of audio data, and a background block 48 consisting of one or more background data are combined, and control information 42 containing data relating to block sizes representing the sizes of the respective blocks, and pointers representing the head positions of the respective blocks is recorded in the head portion thereof. Incidentally, in the case of the mail comprised of only the drawing block 44 and the audio block 46, i.e., in the case of the mail which is produced without using the image data and text data such as documents, the block size of the background block 48 is treated as "0".

Incidentally, a plurality of audio data in the audio block 46 is audio data, including silent data, which is continuously inputted for a time period ranging from a time point when starting production of the mail up to a time point when completing production of the mail. In addition, a plurality of drawing data in the drawing block 14 are drawing data which are inputted synchronously with at least a part of a plurality of audio data in the audio block 46.

Therefore, in particular, both the time information representing the time when inputting the drawing data, and coordinate values of the end point of the drawing data are recorded in the drawing block 44 every drawing data. Now, the time information represents relative time elapsed from a time point when starting production of the mail in the terminal equipment 13. In addition, in order to distinguish between a series of drawing loci, identifiers ("START" and "STOP" in the figure) are recorded at a time point when starting input of a series of drawing data and a time point when completing the input of a series of drawing data, respectively.

That is, during the production of the mail, the terminal equipment 13 adds the time information representing the time when inputting the drawing data as well as the coordinate values of the end point of the drawing data to each of the drawing data which has been inputted.

Next, the description will hereinbelow be given with respect to a first example of the procedure of reproducing a mail in the terminal equipment 13.

Figure 5:
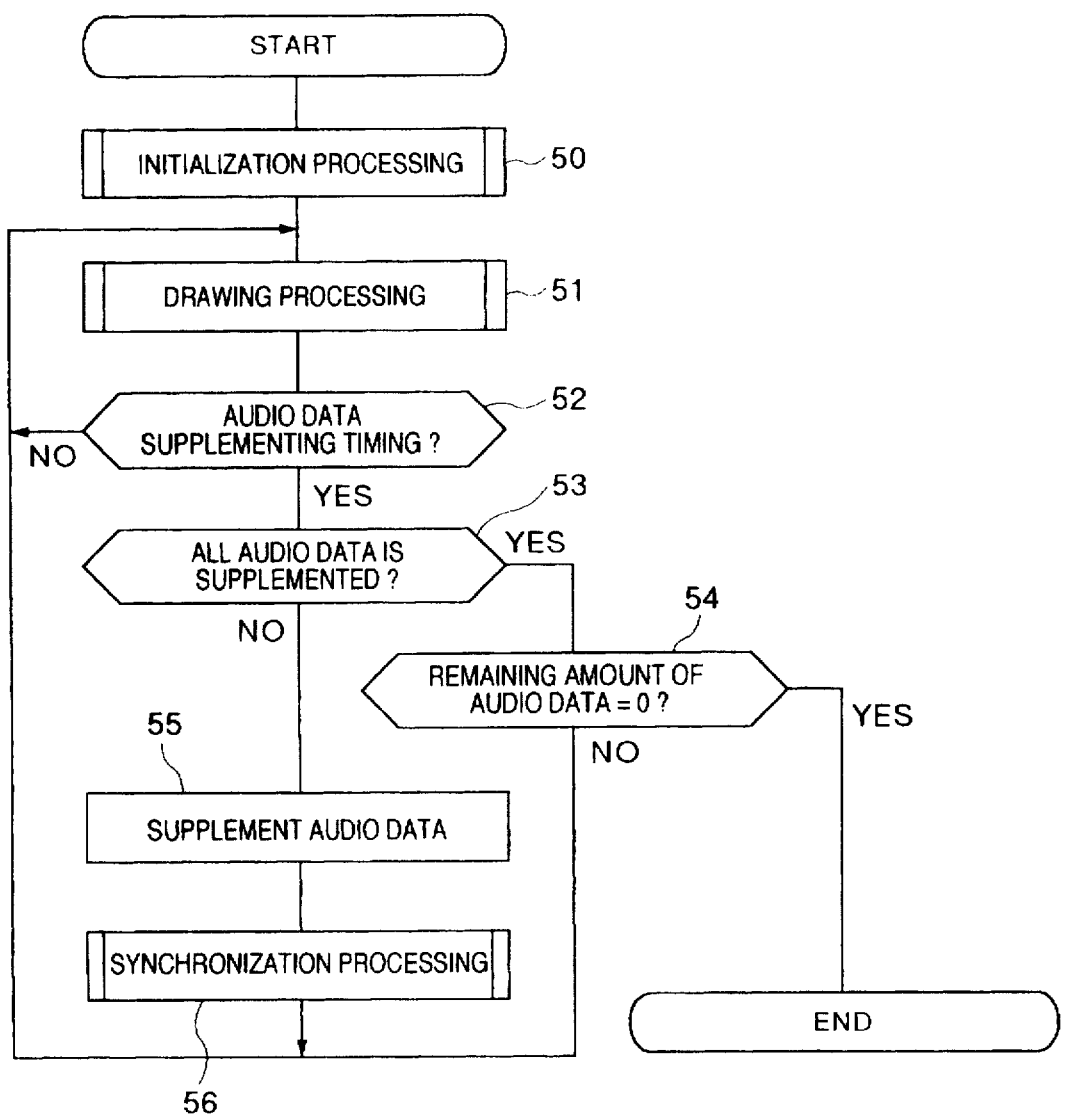
FIG. 5 is a flow chart showing the procedure of reproducing a mail of a first example.

FIG. 5 shows a flow chart of the procedure of reproducing a mail of a first example.

In FIG. 5, at the time when the user instructs the terminal equipment 13 to reproduce the mail, firstly, the terminal equipment 13 carries out an initialization processing (Step 50). In the initialization processing, a flag and a timer which are used in the processings as will be described later are initialized, and also reproduction of the audio data in the audio block 46 is started. Incidentally, the detailed processing contents of the initialization processing will be described later.

Subsequently, a drawing processing is carried out (Step 51). In the drawing processing, one drawing data in the drawing block 44 is reproduced. Incidentally, the detailed processing contents of the drawing processing will be described later.

Next, by monitoring a remaining amount of audio data remaining in a audio buffer provided in the audio board 29, it is judged whether or not it is the timing when the audio data is supplemented to the audio buffer (Step 52).

For example, in the case of the specification that the capacity of the audio buffer is 4 Kbytes, and when the empty capacity of the audio buffer exceeds 1 Kbytes, the audio data is supplemented to the audio buffer, it is monitored whether or not the empty capacity of the audio buffer reaches 1 Kbytes. Then, when the empty capacity exceeds 1 Kbytes, it is judged that it is the timing when the audio data should be supplemented to the audio buffer, or when a time period required for reproducing the audio data of 1 Kbytes has elapsed, it is judged that it is the timing when the audio data should be supplemented to the audio buffer.

When it is judged that it is not the audio data supplementing timing, the processing is returned back to Step 51. On the other hand, when it is judged that it is the audio data supplementing timing, it is checked whether or not the unreproduced audio data remains in the audio block 46 (Step 53).

When the unreproduced audio data remains in the audio block 46, the next audio data is read out, and then is supplemented to the audio buffer provided in the audio board 29 (Step 55). Then, after executing a synchronization processing (Step 56), the processing is returned back to Step 51. Incidentally, the detailed processing contents of the synchronization processing will be described later.

On the other hand, when the unreproduced audio data does not remain in the audio block 46, i.e., when all the audio data in the audio block 46 is supplemented to the audio board 29, a remaining amount of audio data in the audio buffer provided in the audio board 29 is checked (Step 54). Then, if a remaining amount of audio data does not become "0", the processing is returned back to Step 51. On the other hand, if a remaining amount of audio data becomes "0", reproduction of the mail ends.

As for the timing when the audio data is supplemented to the audio buffer, in the case where the capacity of the audio buffer is 10 Kbytes, the supplementation is carried out when the empty capacity of the audio buffer exceeds 2 Kbytes. Thus, the capacity of the audio buffer and the empty capacity of the audio buffer are not limited to those in the above-mentioned example.

In addition, since the contents of the background data do not change with time, the background data in the background block 48 may be reproduced prior to reproduction of the mail.

Figure 6:
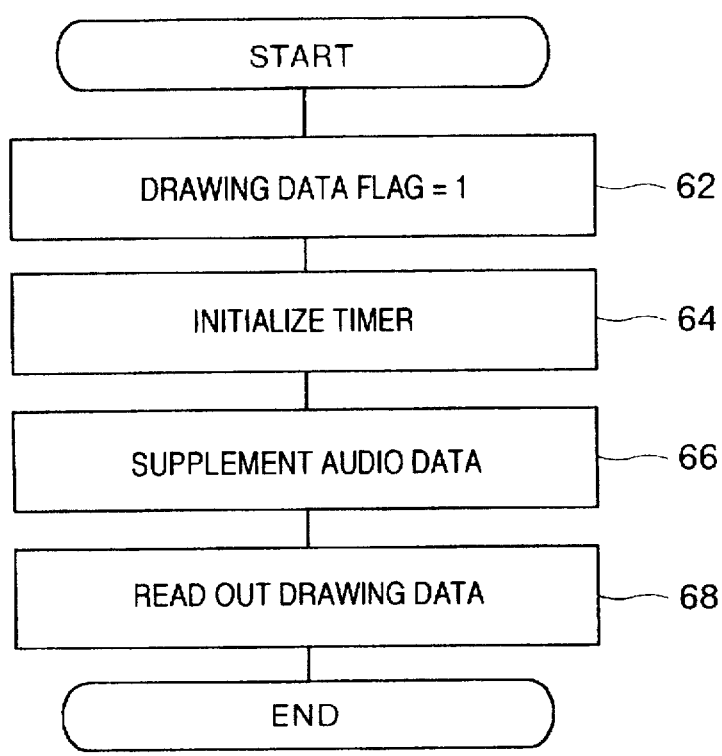
FIG. 6 is a flow chart showing the detailed processing contents of an initialization processing in the first example.

FIG. 6 shows a flow chart of the detailed processing contents of the initialization processing in Step 50.

In FIG. 6, in the initialization processing, firstly, "1" is set to a flag representing whether or not the unreproduced drawing data remains in the drawing block 44(hereinafter, referred to as "a drawing data flag" for short, when applicable)(Step 62).

Subsequently, the timer is initialized which is used to measure a time period elapsed from a time point when starting reproduction of the mail (Step 64).

Next, the audio data, in the audio block 46, for the capacity of the audio buffer provided in the audio board 29 is read out, and the audio data thus read out is supplemented to the audio buffer, thereby starting reproduction of the audio data (Step 66).

Finally, one drawing data in the drawing block 44 is read out (Step 68) in order to provide for the drawing processing in Step 51.

Figure 7:
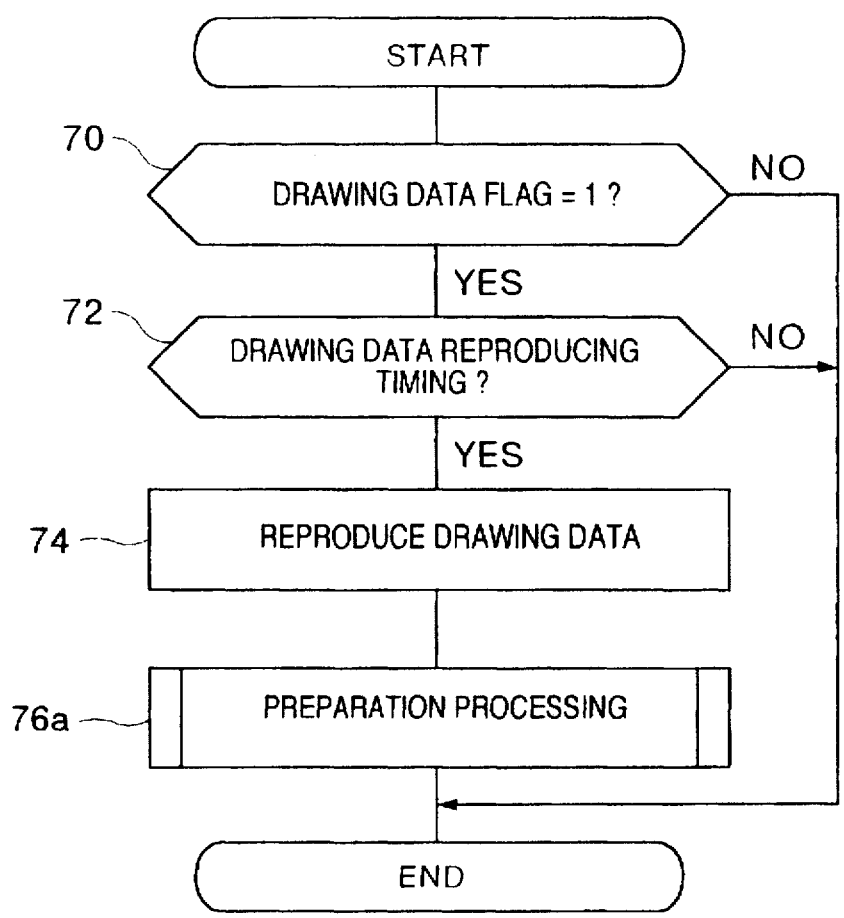
FIG. 7 is a flow chart showing the detailed processing contents of a drawing processing in the first example.

FIG. 7 shows a flow chart of the detailed processing contents of the drawing processing in Step 51.

In FIG. 7, in the drawing processing, firstly, the drawing data flag is checked (Step 70). When the drawing data flag is set to "0", it is judged that all the drawing data in the drawing block 44 has been reproduced, and then the drawing processing ends.

On the other hand, when the drawing data flag is "1", it is checked whether or not it reaches the timing when the drawing data should be reproduced (Step 72). Specifically, in Step 72, the measurement value of the timer (representing a time period elapsed from a time point when starting reproduction of the mail) is compared with the time information corresponding to the drawing data read out in Step 68, and when the measurement value of the timer reaches the time represented by the time information, it is judged that it is the timing when the drawing data should be reproduced.

On the other hand, when it is judged that it is not the timing when the drawing data should be reproduced, the drawing processing ends. When it is judged that it is the timing when the drawing data should be reproduced, the drawing data which was read out in Step 68 is reproduced (Step 74).

Thereafter, a preparation processing for providing for the next drawing processing is executed (Step 76a), and then the drawing processing ends. Incidentally, the detailed processing contents of the preparation processing will be described later.

Figure 8:
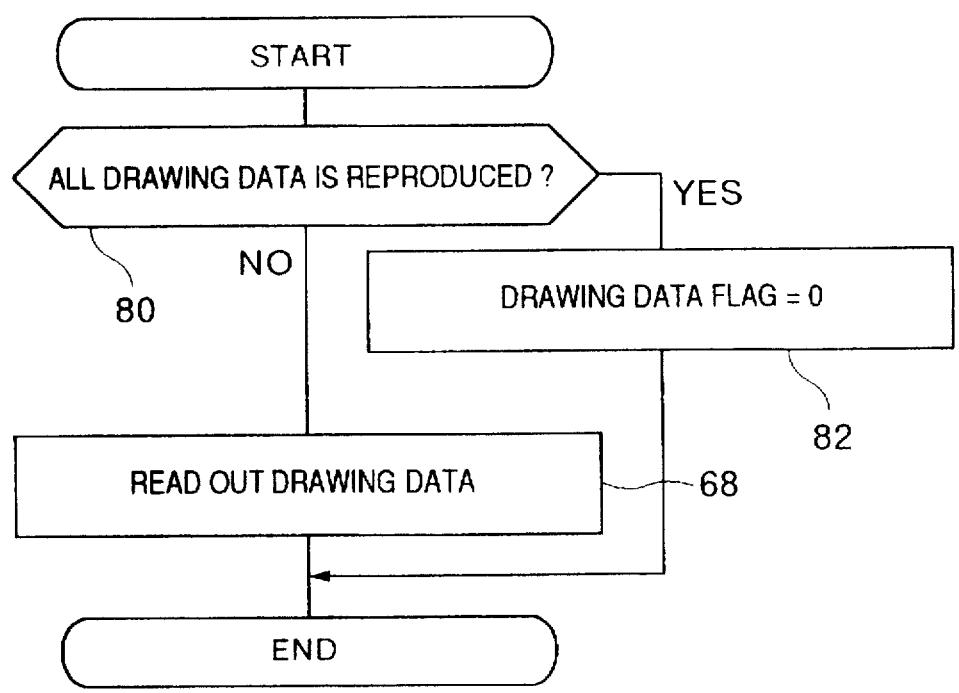
FIG. 8 is a flow chart showing the detailed processing contents of a preparation processing in the first example.

FIG. 8 shows a flow chart of the detailed processing contents of the preparation processing in Step 76a.

In FIG. 8, in the preparation processing, firstly, it is checked whether or not the unreproduced drawing data remains in the drawing block 44 (Step 80).

When the unreproduced drawing data remains in the drawing block 44, next one drawing data in the drawing block 44 is read out (Step 68). On the other hand, when the unreproduced drawing data does not remain in the drawing block 44, i.e., when all the drawing data is reproduced, "0" is set to the drawing data flag (Step 82).

Figure 9:
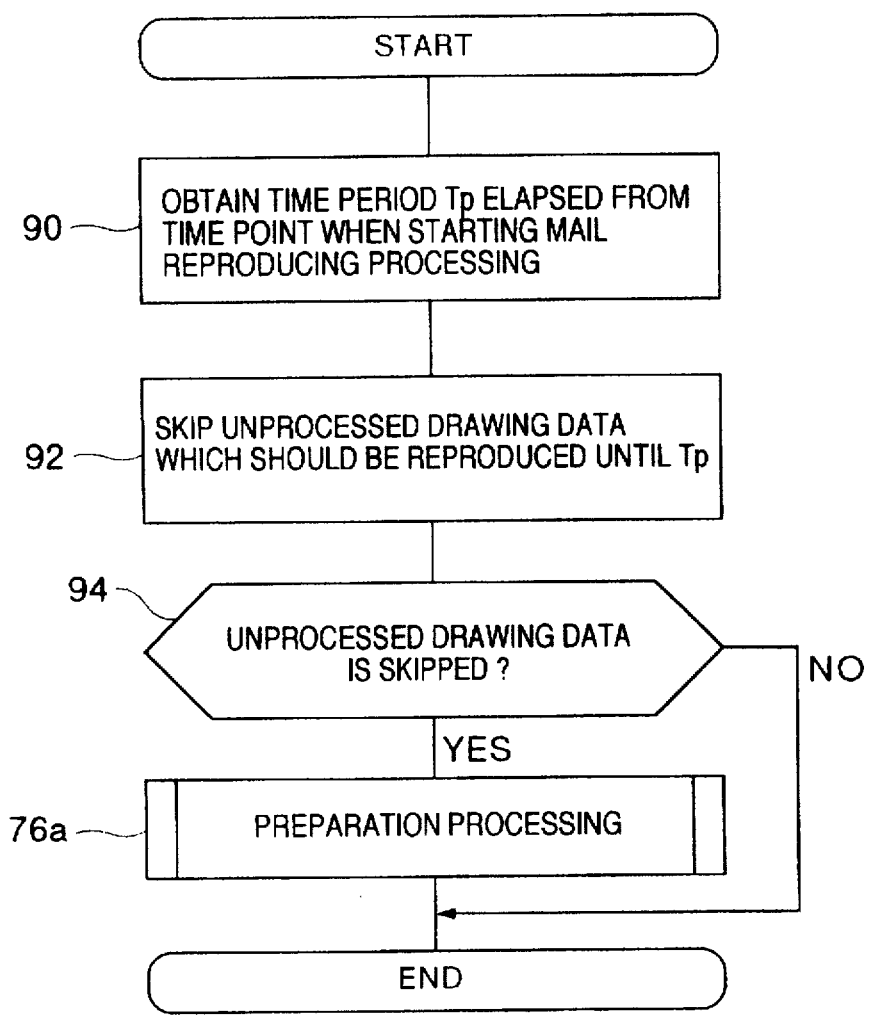
FIG. 9 is a flow chart showing the detailed processing contents of a synchronization processing in the first example.

FIG. 9 shows a flow chart of the detailed processing contents of the synchronization processing in Step 56.

In FIG. 9, in the synchronization processing, firstly, a measurement value Tp of the timer at this time point (representing a time period elapsed from a time point when starting reproduction of the mail) is obtained (Step 90).

Subsequently, when there is the drawing data which should be reproduced until Tp, but is not reproduced since reproduction of the drawing data is behind schedule, all such drawing data is skipped so as not to be reproduced (Step 92).

Next, when all such drawing data is skipped so as not to be reproduced (Step 94), a preparation processing for providing for the next drawing processing is executed (Step 76a), and then the synchronization processing ends.

Figure 10:
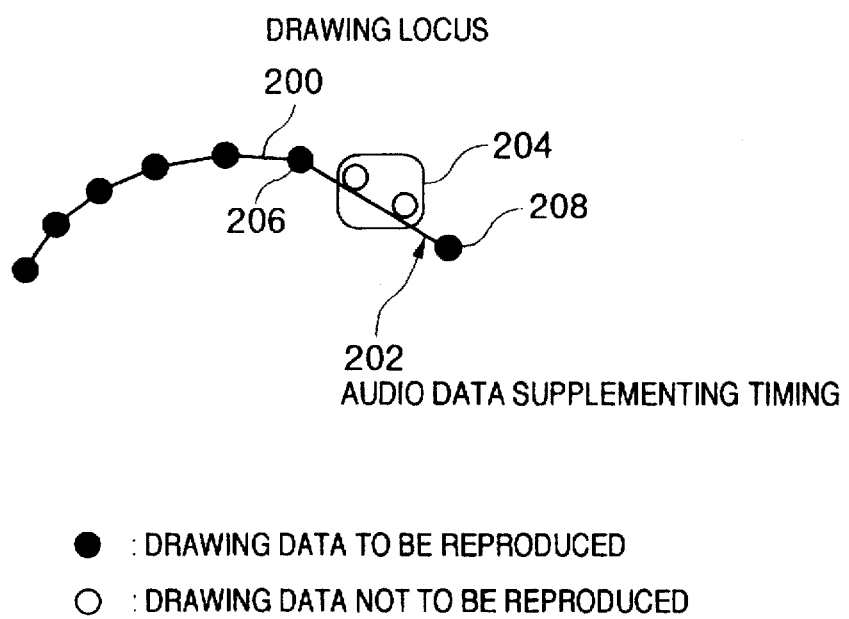
FIG. 10 is a schematic view useful in explaining the drawing data which is reproduced in accordance with a mail reproducing procedure of the first example.

FIG. 10 shows a schematic view of an example of the drawing data which is reproduced in accordance with the mail reproducing procedure of the first example.

In FIG. 10, after the time Tp elapsed from a time point when starting reproduction of the mail has reached the time represented by the time information corresponding to the drawing data, a line segment is drawn between the drawing data of interest and the preceding drawing data so as to form a drawing locus 200.

But, in the case where at the audio data supplementing timing 202 when the audio data should be supplemented to the audio buffer provided in the audio board 29, the drawing data which had to be reproduced essentially until that time point still remains without being reproduced, such drawing data 204 is skipped so as not to be reproduced. Then, when reproducing the next drawing data 208, a line segment is drawn between the drawing data of interest and the preceding drawing data 206.

As a result, when the drawing processing speed of the terminal equipment 13 which reproduces the mail is slower than that of the terminal equipment 13 which has produced and transmitted that mail, or even when the load is applied to the terminal equipment 13 due to other processings, the synchronization of the audio data with the drawing data can be recovered every timing when supplementing the audio data to the audio buffer.

Incidentally, in the first example, it is checked every timing when supplementing the audio data to the audio buffer whether or not there is the drawing data which should be reproduced until that time point, but is not reproduced actually due to the delay of reproduction of the drawing data. However, alternatively, it may be checked every lapse of a fixed time period or every reproduction of one drawing data whether or not there is the drawing data which should be reproduced until that time point but is not reproduced actually due to the delay of reproduction of the drawing data.

Next, the description will hereinbelow be given with respect to a second example of the procedure of reproducing a mail in the terminal equipment 13.

A flow chart showing the mail reproducing procedure of the second example is the same as that of the first example shown in FIG. 5, but an initialization processing, a drawing processing and a synchronization processing of the second example are different from those in Steps 50, 51 and 56 of the above-mentioned first example, respectively.

Figure 11:
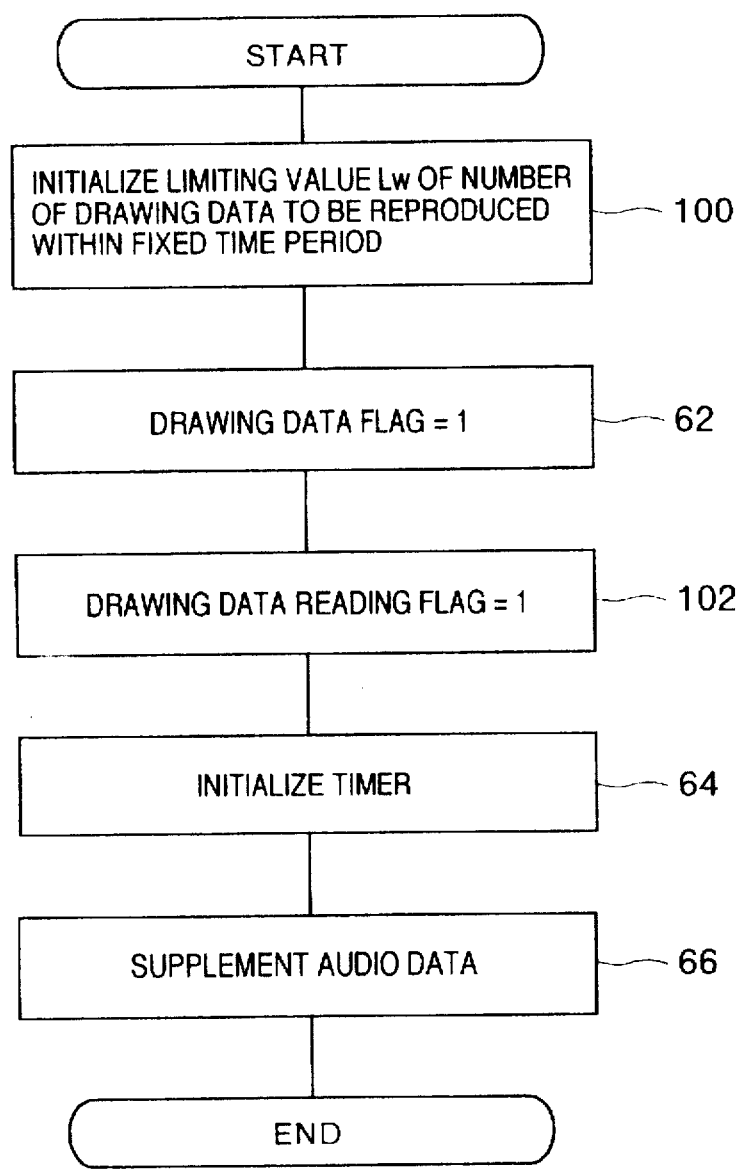
FIG. 11 is a flow chart showing the detailed processing contents of an initialization processing in a second example.

FIG. 11 shows a flow chart of the detailed processing contents of the initialization processing corresponding to Step 50 of the first example.

In FIG. 11, in the initialization processing, firstly, a limiting value Lw of the number of drawing data to be reproduced within a fixed time period is initialized (Step 100). As for the fixed time period, i.e., the time interval for limiting the number of drawing data, there is employed a time interval for supplementing the audio data to the audio buffer provided in the audio board 29. Incidentally, an initial value of the limiting value Lw can be made variable as will be described later.

Subsequently, "1" is set to the drawing data flag (Step 62), and "1" is also set to a flag representing whether or not the drawing data in the drawing block 44 should be read out (hereinafter, referred to as "a drawing data reading flag" for short, when applicable)(Step 102).

Next, the timer for measuring a time period elapsed from a time point when starting reproduction of the mail is initialized (Step 64), and the audio data, in the audio block 46, for the capacity of the audio buffer provided in the audio board 29 is read out so as to be supplemented to the audio board 29, whereby reproduction of the audio data is started (Step 66).

Figure 12:
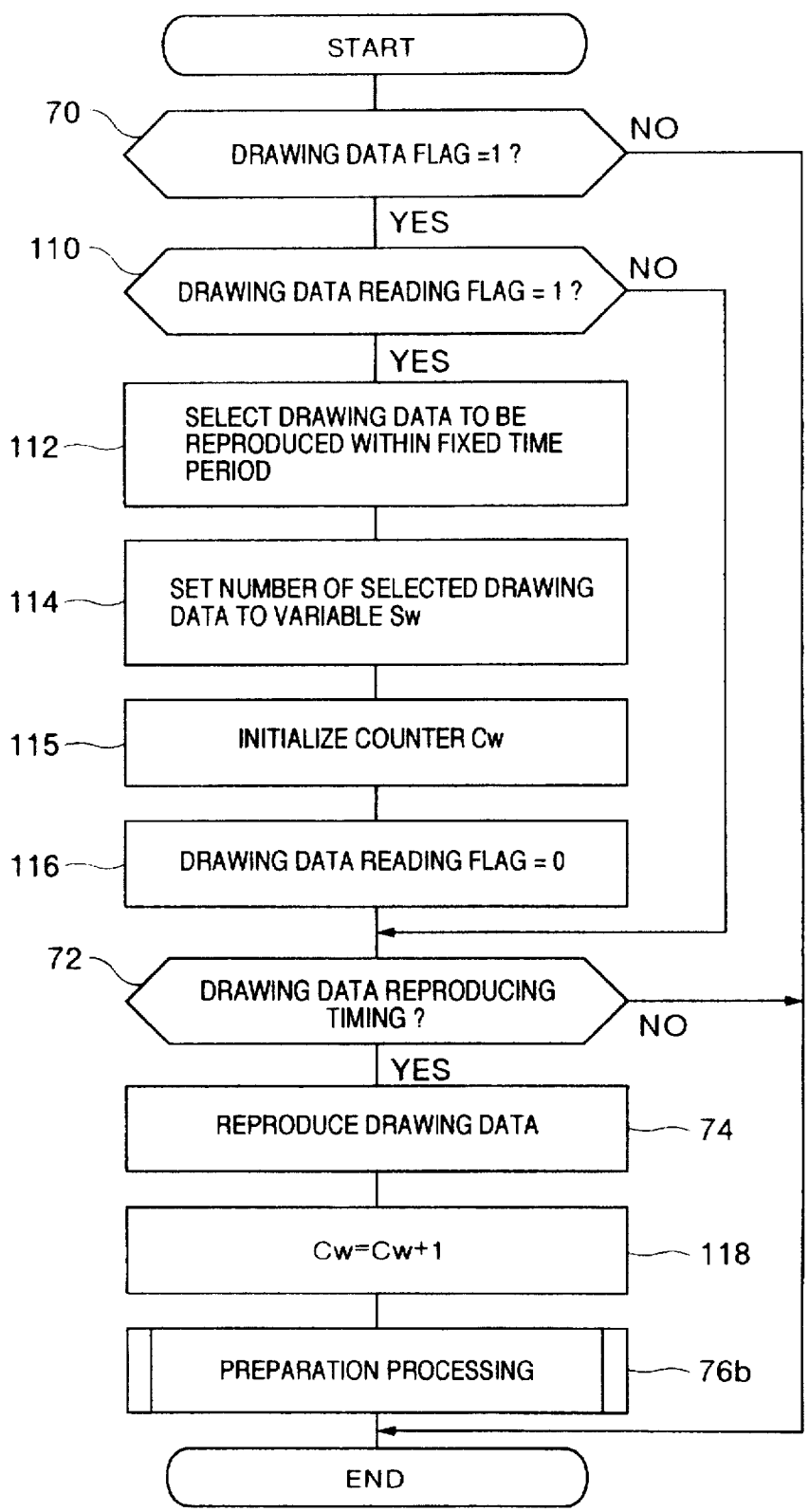
FIG. 12 is a flow chart showing the detailed processing contents of a drawing processing in the second example.

FIG. 12 shows a flow chart of the detailed processing contents of the drawing processing corresponding to Step 51 of the first example.

In FIG. 12, in the drawing processing, firstly, the drawing data flag is checked (Step 70). When the drawing data flag is set to "0", all the drawing data in the drawing block 44 is judged to be reproduced, and the drawing processing ends.

On the other hand, when the drawing data flag is "1", the drawing data reading flag is checked (Step 110). Then, when the drawing data reading flag is set to "0", the processing proceeds to Step 72.

On the other hand, when the drawing data reading flag is set to "1", all the drawing data is read out which should be read out within a fixed time period (i.e., a time period required for time to reach the timing when supplementing the audio data to the audio buffer provided in the audio board 29, and the number of drawing data thus read out is set temporarily to a variable Aw. Then, when the variable Aw is larger than the limiting value Lw, the drawing data which should be actually reproduced is selected from the drawing data thus read out so as for the number of drawing data which is actually reproduced to become smaller than the limiting value Lw (Step 112).

As for the selection method in Step 112, for example, the drawing data is selected in order in the drawing block 44. In addition, for example, the drawing data is selected every two data apart or every three data apart so as for the intervals of the drawing data to be reproduced to become uniform. Further, for example, on the basis of the coordinate values corresponding to the drawing data which has been read out, the drawing data of the combination for permitting a length of the line segment in reproduction to be long is selected.

Subsequently, the number of drawing data which has been selected in Step 112 is set temporarily to a variable Sw (Step 114), a counter Cw for counting the number of drawing data reproduced within a fixed time period is initialized (Step 115), and "0" is set to the drawing data reading flag (Step 116). Then, the processing proceeds to Step 72.

In Step 72, it is judged whether or not it reaches the timing when the drawing data should be reproduced (Step 72). Specifically, in Step 72, a value measured by the timer (representing a time period elapsed from a time point when starting reproduction of the mail) is compared with the time information corresponding to the drawing data to be reproduced. Then, when the measurement value of the timer reaches the time represented by the time information, it is judged that it is the timing when the drawing data should be reproduced.

When it is judged that is is not the timing when the drawing data should be reproduced, the drawing processing ends. On the other hand, when it is judged that it is the timing when the drawing data should be reproduced, the drawing data is reproduced (Step 74).

Subsequently, after "1" is added to the contents of the counter Cw (Step 118) and also the preparation processing for providing for the next drawing processing is executed (Step 76b), the drawing processing ends. Incidentally, the flow chart showing the detailed processing contents of the preparation processing does not correspond to the flow chart shown in FIG. 8, but is as shown in FIG. 13.

Figure 13:
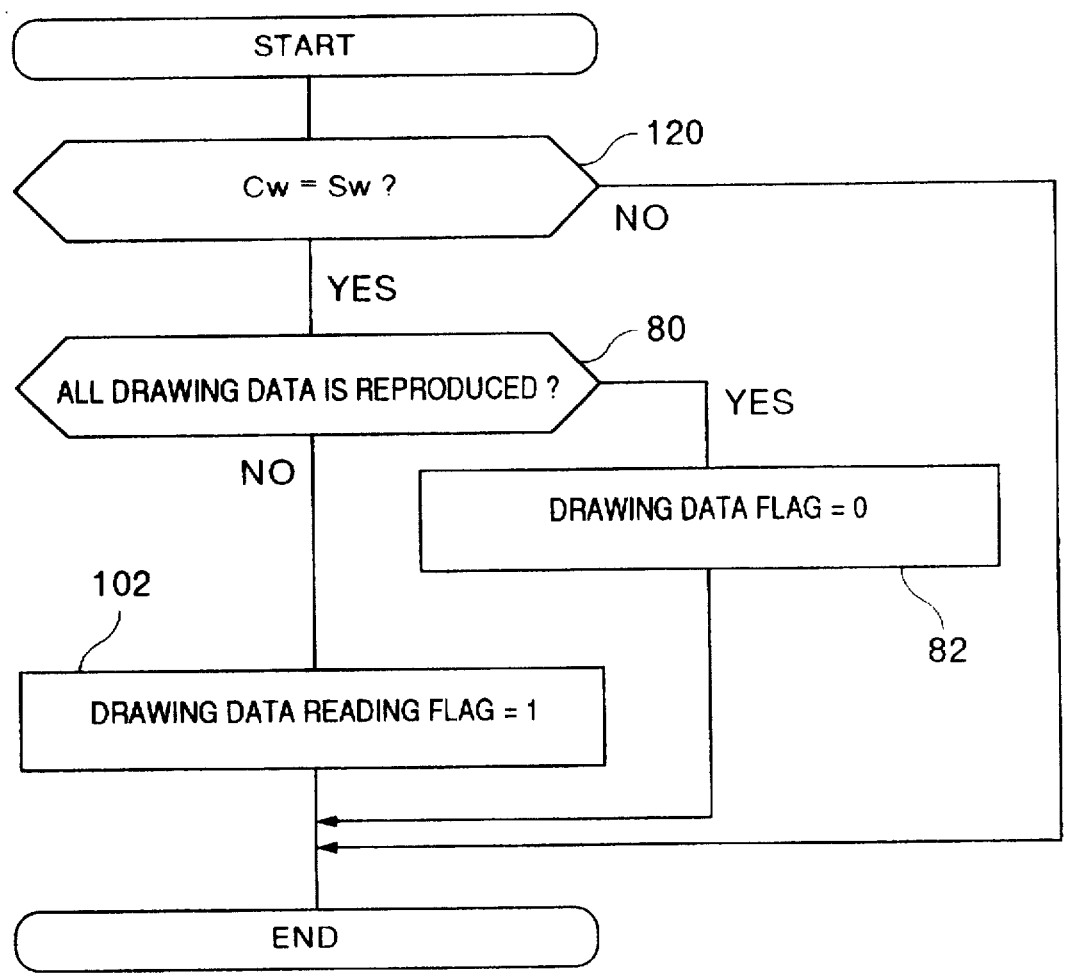
FIG. 13 is a flow chart showing the detailed processing contents of a preparation processing in the second example.

That is, as shown in FIG. 13, in the preparation processing, firstly, by comparing the contents of the counter Cw with the variable Sw, it is checked whether or not all the drawing data selected in Step 112 has been reproduced (Step 120). If so, it is checked whether or not the unreproduced drawing data remains in the drawing block 44 (Step 80).

When the unreproduced drawing data remains in the drawing block 44, the preparation is carried out in such a way that after "1" is set to the drawing data reading flag (Step 102), the new drawing data is read out in the next drawing processing. On the other hand, when the unreproduced drawing data does not remain in the drawing block 44, "0" is set to the drawing data flag (Step 82).

Figure 14:
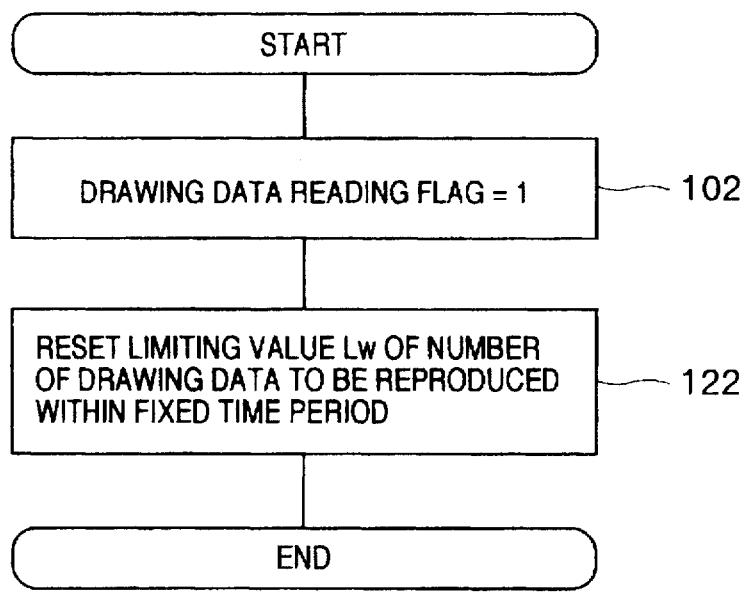
FIG. 14 is a flow chart showing the detailed processing contents of a synchronization processing in the second example.

FIG. 14 shows flow chart of the detailed processing contents of the synchronization processing corresponding to Step 56 of the first example.

In the second example, the synchronization processing has the processing contents associated with Steps 110 to 116 in the drawing processing shown in FIG. 12 and Steps 120 and 102 in the preparation processing shown in FIG. 13.

That is, as shown in FIG. 14, in the synchronization processing, firstly, "1" is set to the drawing data reading flag (Step 102). As a result, in the next drawing processing, the drawing data to be reproduced is newly selected. In other words, out of the drawing data selected in the present drawing processing, the drawing data which is unreproduced at this time is discarded.

Subsequently, on the basis of existence and non-existence of the discarded drawing data, a limiting value Lw of the number of drawing data to be reproduced within a fixed time period is reset (Step 122). For example, in the case where there is no discarded drawing data under the circumstances that a variable Sw representing the number of selected drawing data is small than a variable Aw representing the number of drawing data to be reproduced within a fixed time period, the limiting value Lw is increased. On the other hand, in the case where there is much discarded drawing data, the limiting value Lw is decreased.

In such a way, except for Step 122, the synchronization processing is executed with the limiting value Lw fixed.

Now, the description will hereinbelow be given with respect to a method of setting an initial value of the limiting value Lw.

Figure 15:
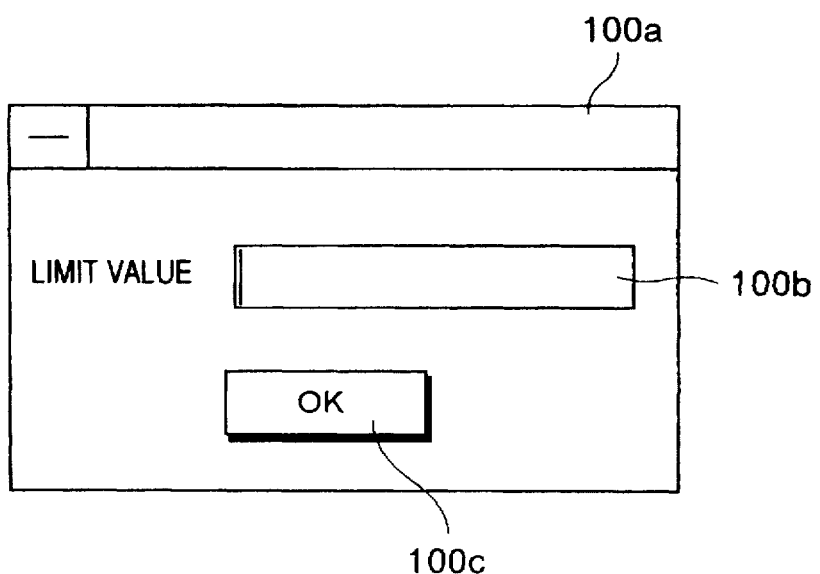
FIG. 15 is a schematic view useful in explaining a method of setting an initial value of a limiting value for the number of drawing data to be reproduced within a fixed time period.

For example, the initial value of the limiting value Lw can be made a numeric value which is set by the user. That is, as shown in FIG. 15, the terminal equipment 13 instructs the display unit 23 to display an area 100a in which the initial value of the limiting value Lw is to be set. Then, the user inputs a numeric value in a predetermined frame 100b using the text data input unit 24. Then, the user obtains that numeric value at a time point when the user presses down a button 100c. The numeric value thus obtained can be used as the initial value of the limiting value Lw. In such a way, the initial value of the limiting value Lw can be set.

Figure 16:
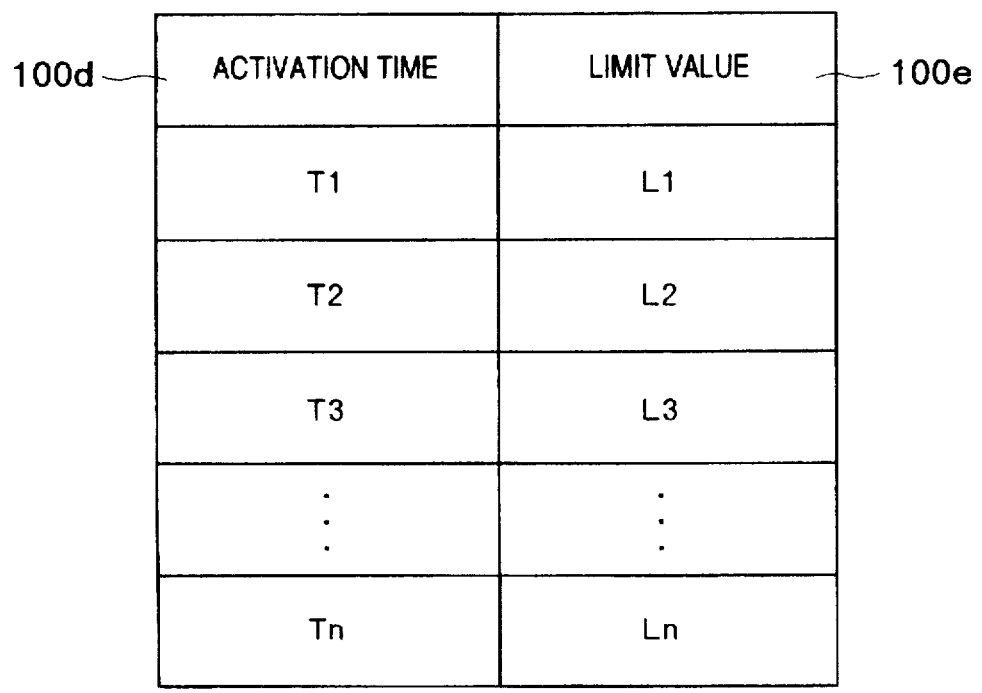
FIG. 16 is a schematic view useful in explaining a method of setting an initial value of a limiting value for the number of drawing data to be reproduced within a fixed time period.

In addition, for example, the initial value of the limiting value Lw can be made a numeric value corresponding to the processing capability or the loading situation of the processor 20 of the terminal equipment 13. That is, the terminal equipment 13 estimates the processing capability or the loading situation of the processor 20 from a time period required for activating the application program, and then can employ, on the basis of a correspondence table previously prepared as shown in FIG. 16, a limiting value 100e corresponding to activation time 100d of the application program as the initial value of the limiting value Lw.

Figures 17, 18:
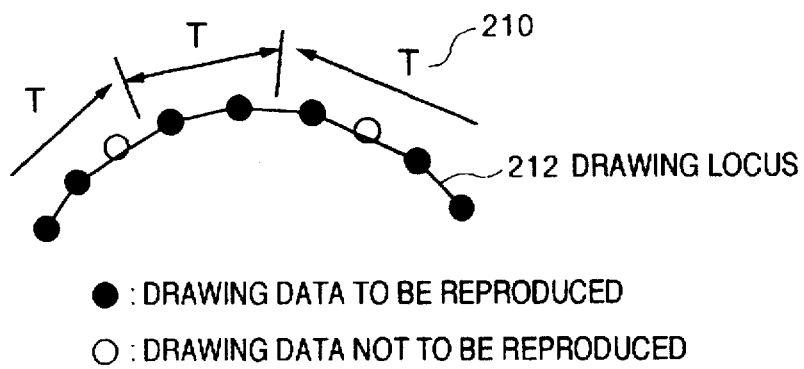
FIG. 17 is a schematic view useful in explaining a method of setting an initial value of a limiting value for the number of drawing data to be reproduced within a fixed time period.
FIG. 18 is a schematic view useful in explaining the drawing data which is reproduced in accordance with a mail reproducing procedure of a second example.

Further, for example, the initial value of the limiting value Lw can be made a numeric value corresponding to the actual drawing processing capability of the terminal equipment 13. That is, as shown in FIG. 17, prior to reproduction of the mail, the terminal equipment 13 measures the number of drawing data, which is reproducible within a fixed time period (i.e., within a time interval required for supplementing the audio data to the audio buffer provided in the audio board 29) several times. Then, a maximum value 100g of the number of measured drawing data 100f (the number of processings) can be employed as the initial value of the limiting value Lw.

FIG. 18 is a schematic view showing an example of the drawing data which is reproduced in accordance with the mail reproducing procedure of the second example.

As shown in FIG. 18, the number of drawing data which should be reproduced within a fixed time period T (210) is limited (it is limited to "2" in an example of FIG. 18), whereby when the drawing processing speed of the terminal equipment 13 which reproduces the mail is slower than that of the terminal equipment 13 which has produced and transmitted that mail, or even when the load is applied to the terminal equipment due to other processings, the audio data can be synchronized with the drawing data.

Incidentally, the reproduced drawing locus 212 depends on the selection method of selecting the drawing data which should be reproduced actually. However, every lapse of a fixed time period T (210), the drawing data which should be reproduced actually within the associated time period is selected, whereby it is possible to prevent the discarded drawing data from continuing and also it is possible to reproduce the drawing data with the features of the drawing data inputted in production of the mail left as they are.

Next, the description will hereinbelow be given with respect to a third example of the procedure of reproducing a mail in the terminal equipment 13.

A flow chart showing the mail reproducing procedure of the third example is substantially the same as that shown in FIG. 5 except that the synchronization processing in Step 56 is removed. In addition, the drawing processing of the third example is different from the drawing processing in Step 51 of the above-mentioned first example.

Figure 19:
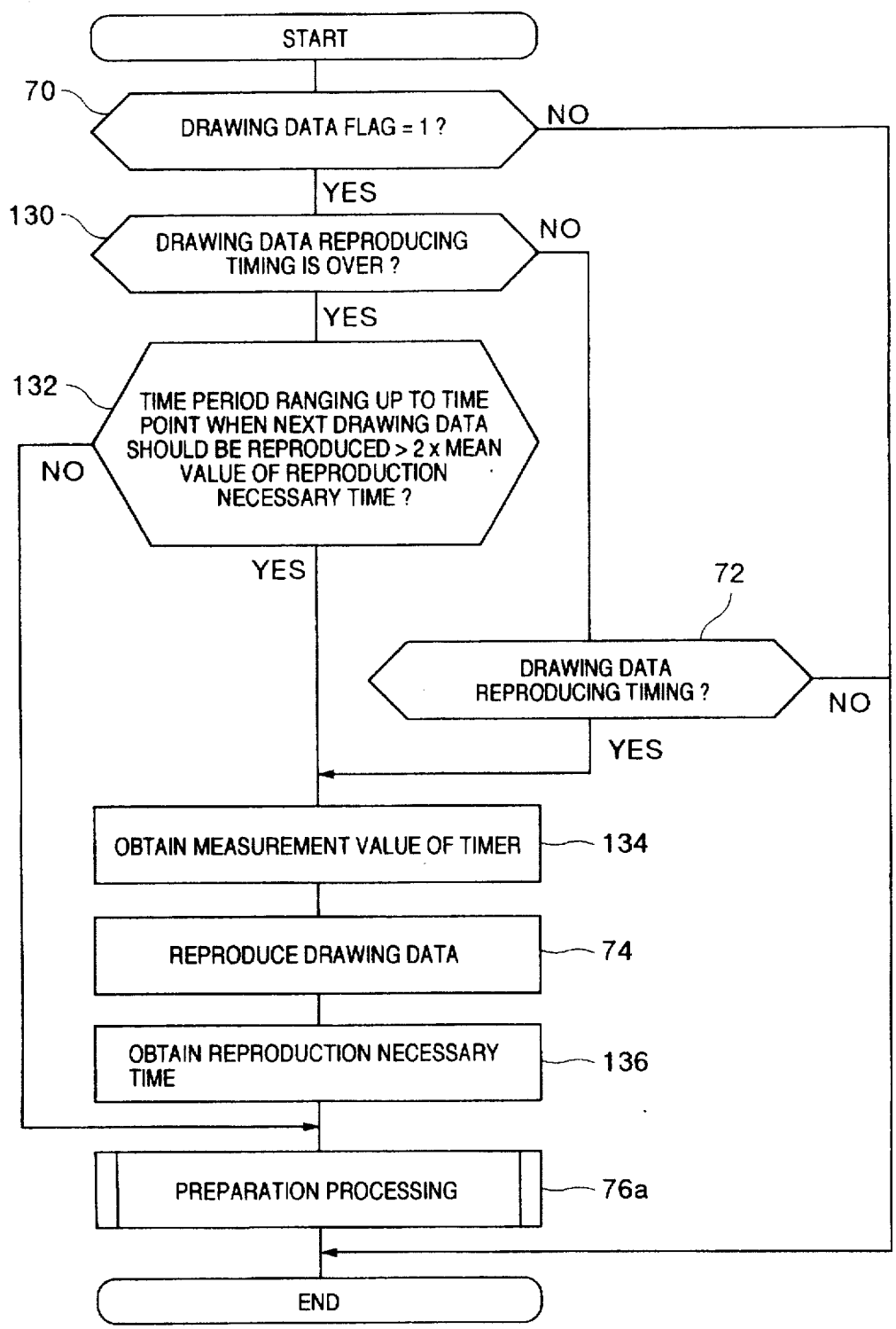
FIG. 19 a flow chart showing the detailed processing contents of a drawing processing in a third example.

FIG. 19 shows a flow chart of the detailed processing contents of the drawing processing corresponding to Step 51 of the above-mentioned first example.

In the third example, the processing corresponding to the removed synchronization processing is contained in the drawing processing.

That is, as shown in FIG. 19, in the drawing processing, firstly, the drawing data flag is checked (Step 70). When the drawing data flag is set to "0", the drawing processing ends.

On the other hand, when the drawing data flag is set to "1", it is checked whether or not the measurement value of the timer (representing a time period elapsed from a time point when starting reproduction of the mail) exceeds the time represented by the time information corresponding to the drawing data which is currently read out (Step 130). In Step 130, for example, when a value which is obtained by subtracting the time represented by the time information from the measurement value of the timer is equal to or more than one second, the synchronization of the drawing data with the audio data can not be recovered. That is, it is judged that the timing when the drawing data should be reproduced is over.

When it is judged that the timing when the drawing data should be reproduced is not over, after it reaches the timing when the drawing data should be reproduced (Step 72), the processing proceeds to Step 134, and the drawing data is reproduced.

On the other hand, when it is judged that the timing when the drawing data should be reproduced is over, the time represented by the time information corresponding to the drawing data which is expected to be reproduced at next time is referred. Then, it is judged whether or not a time period ranging from that time point up to a time point when the next drawing data should be reproduced is equal to or more than twice as long as a mean value of a time period required for reproducing one drawing data (hereinafter, referred to as "reproduction necessary time for the drawing data" for short, when applicable)(Step 132). Incidentally, the reproduction necessary time for the drawing data is obtained whenever reproducing the drawing data in Step 136 as will be described later.

As a result of comparison in Step 132, when the condition is fulfilled, even in the case of the drawing data over the timing when the drawing data should be reproduced, that drawing data is not discarded, but the processing proceeds to Step 134 and that drawing data is reproduced.

In Step 134, the data relating to the time of a time point before reproducing the drawing data is obtained by referring to the measurement value of the timer, and then one drawing data is reproduced (Step 74). At this time, the reproduction necessary time for the drawing data is obtained (Step 136).

When the drawing data over the timing when the drawing data should be reproduced is discarded, or when completing reproduction of the drawing data, the lo preparation processing for providing for the next drawing processing is executed (Step 76a), and then the drawing processing ends. Incidentally, the detailed processing contents of the preparation processing are the same as those shown in the flow chart of FIG. 8.

Figure 20:
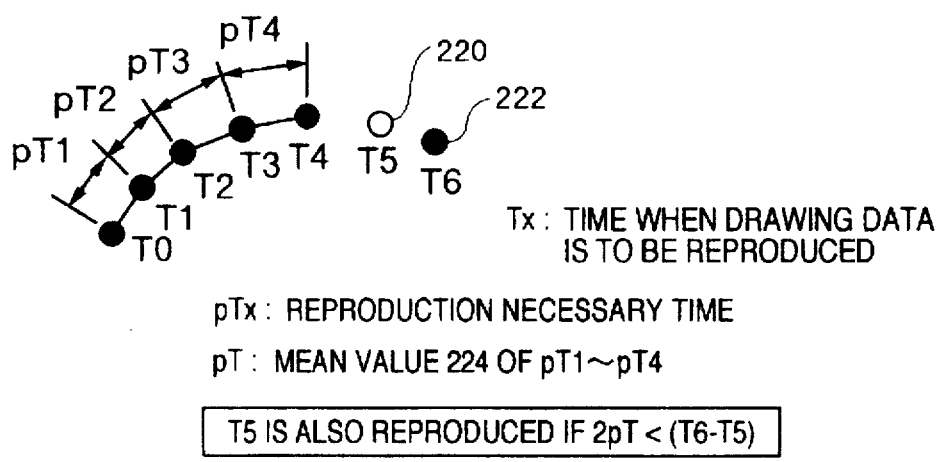
FIG. 20 is a schematic view useful in explaining the drawing data which is reproduced in accordance with a mail reproducing procedure of the third example.

FIG. 20 shows in schematic view an example of the drawing data which is reproduced in accordance with the procedure of reproducing a mail of a third example.

In FIG. 20, after time elapsed from a time point when starting reproduction of the mail reaches the time represented by the time information corresponding to the drawing data of interest, a line segment is drawn between the drawing data of interest and the preceding drawing data.

But, when the drawing data 220 occurs which has been over the timing when the drawing data should be reproduced, a time period ranging up to a time point when the next drawing data 222 should be reproduced is compared with a mean value 224 of the reproduction necessary time for the drawing data. Then, if a time period ranging up to a time point when the next drawing data 222 should be reproduced is equal to or more than twice as long as the mean value 224, then even the drawing data 220 is reproduced which has been over the timing when the drawing data should be reproduced. If not, then such drawing data 220 is skipped so as not to be reproduced.

As a result, when the drawing processing speed of the terminal equipment 13 which reproduces the mail is slower than that of the terminal equipment 13 which has produced and transmitted the mail, or when the load is applied to the terminal equipment due to other processings, even if reproduction of the drawing data were delayed, the more drawing data can be reproduced, and also whenever reproducing one drawing data, the synchronization of the audio data with the drawing data can be corrected.

Next, the description will hereinbelow be given with respect to a fourth example of the procedure of reproducing a mail in the terminal equipment 13.

A flow chart showing the procedure of reproducing a mail of the fourth example is substantially the same as that of the above-mentioned first example shown in FIG. 5 except for an initialization processing and a synchronization processing corresponding to Steps 50 and 56 of the above-mentioned first example, respectively.

Figure 21:
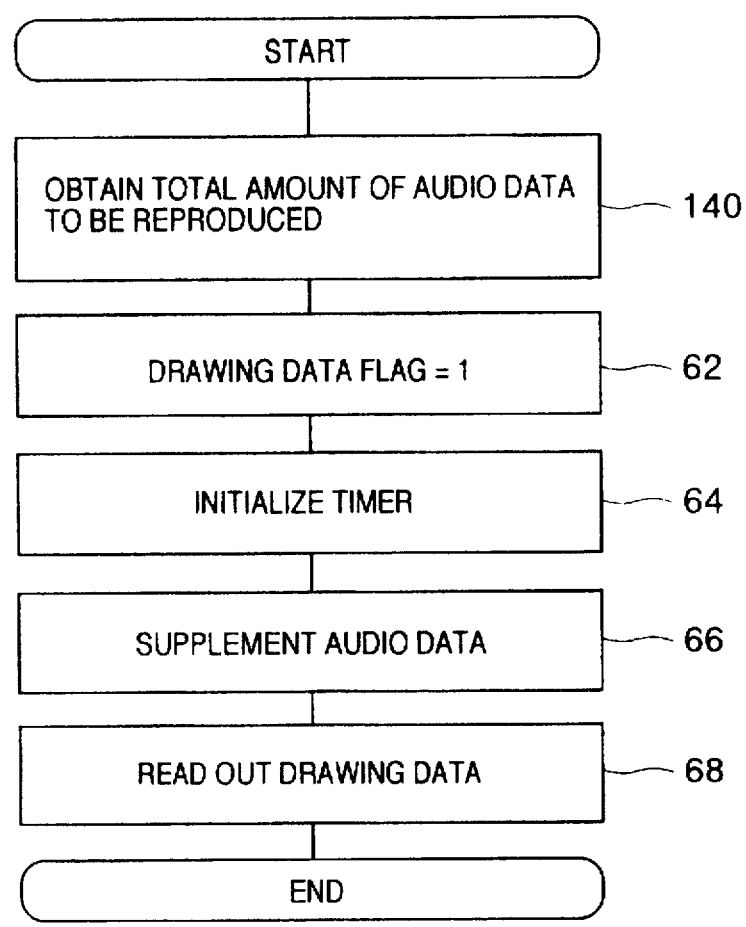
FIG. 21 is a flow chart showing the detailed processing contents of an initialization processing in a fourth example.

FIG. 21 show a flow chart of the detailed processing contents of an initialization processing corresponding to Step 50.

In FIG. 21, in the initialization processing, firstly, the block size of the audio block 46 recorded in the control information 42 is checked, thereby obtaining the total amount of audio data to be reproduced (Step 140).

With respect to the processings after Step 140, in the same manner as that in the flow chart shown in FIG. 6, the processings of Steps 62 to 68 are executed in this order. Incidentally, the order of Steps 140 and 62 may be reversed.

Figure 22:
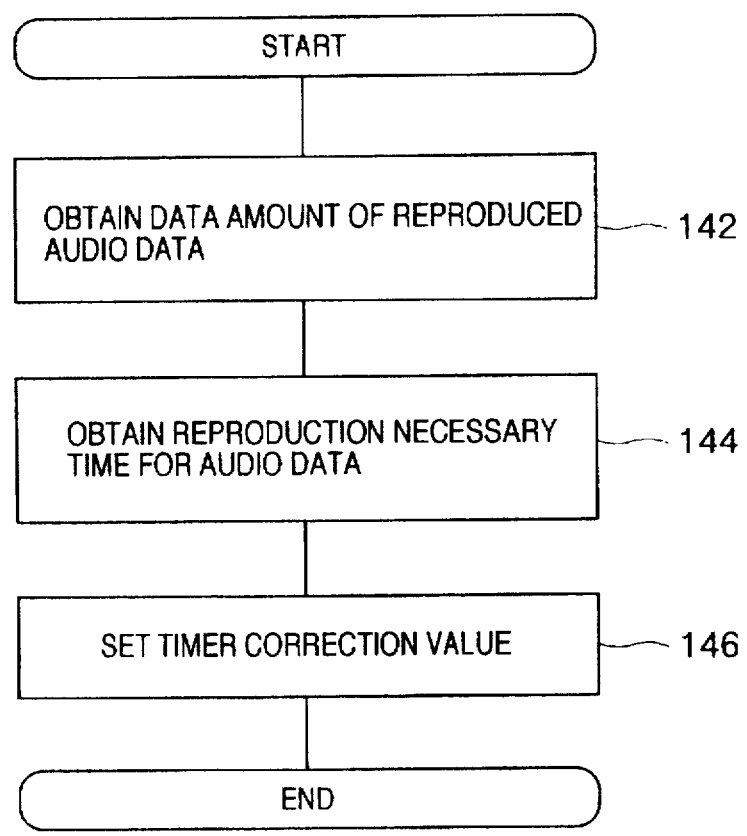
FIG. 22 is a flow chart showing the detailed processing contents of a synchronization processing in a fourth example.

FIG. 22 is a flow chart showing the detailed processing contents of the synchronization processing corresponding to Step 56.

As shown in FIG. 22, in the synchronization processing, firstly, a value which is obtained by summing up a data amount of unreproduced audio data obtained in Step 53 and a data amount of audio data remaining in the audio buffer provided in the audio board 29 and obtained in Step 52 is subtracted from the total amount of audio data obtained in Step 140 of the initialization processing, thereby obtaining a data amount of reproduced audio data (Step 142).

Subsequently, if with respect to the reproduction processing speed for the audio data, for example, only 4 bytes of the audio data is reproduced for 1 msec, then a data amount of reproduced audio data is divided by "4", thereby obtaining a time period required for reproducing the audio data (hereinafter, referred to as "reproduction necessary time for the audio data", when applicable)(Step 144).

Next, a difference value between the reproduction necessary time for the audio data obtained in Step 144 and a time period elapsed from a time point when starting reproduction of the mail is set as a timer correction value (Step 146).

As a result, when it is judged in the drawing processing whether or not it reaches the timing when the drawing data should be reproduced, the timer correction value is subtracted from a measurement value of the timer (representing a time period elapsed from a time point when starting reproduction of the mail), and then the resultant value is compared with the time information corresponding to the drawing data.

Incidentally, in calculation of the reproduction necessary time for the audio data, if with respect to the reproduction processing speed for the audio data, only 10 bytes are reproduced for 1 msec, then a data amount of reproduced audio data is divided by "10". Thus, a different value is employed as a value, which is used to divide a data amount of reproduced audio data, in correspondence to the specification of the terminal equipment 13.

FIG. 23 shows in schematic view the effects provided by the mail reproducing procedure of the fourth example.

Let us consider the case where in production of the mail 250, for a lapse of time elapsed from a time point when starting production of the mail (mail production necessary time) 254, a time period 252 required for inputting the audio data and a time period 256 required for inputting the drawing data are as shown in FIG. 23. That is, let us consider the case where the mail is produced without interrupting input of the audio data.

In this case, if reproduction is interrupted in reproducing the mail 260, then, when restarting reproduction, the audio data can be reproduced continuously from a time point when interrupting reproduction. However, since a lapse of time elapsed from a time point when starting reproduction of the mail (mail reproduction necessary time) 264 does not match a time period required for reproducing the audio data 262, if it is judged with respect to the drawing data whether or not it reaches the timing when the drawing data should be reproduced on the basis of comparison of a time period elapsed from a time point when starting reproduction of the mail with the time represented by the time information corresponding to the drawing data, then as shown in a time period 266 required for reproducing the drawing data, the audio data can not be synchronized with the drawing data.

On the other hand, as described above, when supplementing the audio data to the audio buffer provided in the audio board 29, a difference between the mail reproduction necessary time 264 and a time period 262 required for reproducing the audio data is set as a timer correction value, and the timer correction value thus set is utilized when judging whether or not it reaches the timing when the drawing data should be reproduced, whereby as shown in a time period 268 required for reproducing the drawing data, the audio data can be synchronized with the drawing data.

In such a way, even in the case where reproduction of the audio data is interrupted, and hence a difference occurs between the mail reproduction necessary time 264 and the time period 262 required for reproducing the audio data, after restarting reproduction of the audio data, the audio data is synchronized with the drawing data again, thereby enabling the mail to be reproduced.

The mail reproducing processing in each of the examples which are described above with reference to the flowcharts of FIGS. 5–9, 11–14, 19, 21 and 22 may be implemented by loading a respective mail reproducing program stored in the file unit 22 of FIG. 3, in the program memory 21 and executing the program by the processor 20. The program may be stored in a computer-readable storage medium, such as a hard disk device, a floppy disk device or a CD-ROM device. In that case, the program stored in the storage medium is loaded into the program memory 21 and is executed by the processor 20 to thereby perform a mail reproduction processing.

As described above, according to the mail reproducing procedure of the first example, in the terminal equipment 13 which reproduces the mail, if at a time point when supplementing the audio data to the audio buffer provided in the audio board 29, the drawing data which should be reproduced until that time point remains unreproduced, then such drawing data is skipped so as not to be reproduced. Therefore, even when reproduction of the drawing data is delayed, the synchronization of the audio data with the drawing data can be recovered whenever supplementing the audio data to the audio buffer.

In addition, according to the mail reproducing procedure of the second example, in the terminal equipment 13 which reproduces the mail, since the number of drawing data to be reproduced within a fixed time period is limited, the audio data can be synchronized with the drawing data.

Further, according to the mail reproducing procedure of the third example, in the terminal equipment 13 which reproduces the mail, it is judged whether or not the drawing data is reproducible, which is still unreproduced even when it is over the timing when the drawing data should be reproduced, on the basis of comparison of time elapsing until the next drawing data is reproduced with the mean value of a time period required for reproducing one drawing data, and if reproducible, that drawing data is reproduced. Therefore, even when reproduction of the drawing data is delayed, the more drawing data can be reproduced, and also synchronization of the audio data with the drawing data can be corrected whenever reproducing one drawing data.

Furthermore, according to the mail reproducing procedure of the fourth example, in the terminal equipment 13 which reproduces the mail, the calculation of a time period elapsed from a time point when starting reproduction of the mail which is utilized in order to judge whether or not it reaches the timing when the drawing data should be reproduced is corrected on the basis of a data amount of reproduced audio data. Therefore, even when reproduction of the audio data is interrupted, after restarting reproduction of the audio data, the audio data can be synchronized with the drawing data again.

As set forth hereinabove, according to the mail terminal equipment of the present invention, even when in reproduction of the mail, reproduction of the drawing data is later than that of the audio data due to the drawing processing speed, the loading situation and the like, reproduction of the audio data is given priority, and the drawing data is thinned out so as to be reproduced, whereby the audio data is synchronized with the drawing data without interrupting reproduction of the audio data, thereby enabling the mail to be realized.

While the present invention has been particularly shown and described with reference to the preferred embodiments, it will be understood by those skilled in the art that the foregoing and other changes in form and details can be made therein without departing from the spirit and scope of the invention.

We claim:

1. A mail terminal equipment for receiving and reproducing a mail which has been produced using multi-media data containing a plurality of continuous audio data and a plurality of drawing data synchronized with at least a part of the plurality of audio data and has been transmitted thereto, said equipment comprising:

reception means for receiving the mail in which time information representing relative time elapsed from a time point when starting production of the mail is added to each of the plurality of drawing data;

audio reproducing means for reproducing successively the plurality of audio data contained in the mail received by said reception means; and drawing reproducing means for reproducing, when relative time elapsed from a time point when starting reproduction of the mail reaches the time represented by the time information added to the drawing data of interest, the drawing data of interest if other drawing data is not being reproduced, and discarding the drawing data of interest if other drawing data is being reproduced, with respect to each of the plurality of drawing data contained in the mail received by said reception means.

2. A mail terminal equipment according to claim 1, further comprising correction means for correcting the relative time elapsed from a time point when starting reproduction of the mail in correspondence to the total number of audio data reproduced by said audio reproducing means.

3. A mail terminal equipment according to claim 1 further comprising means for calculating a relative time elapsed after starting of a mail reproduction from the total number of audio data reproduced by said audio reproducing means.

4. A mail terminal equipment for receiving and reproducing a mail which has been produced using multi-media data containing a plurality of continuous audio data and a plurality of drawing data synchronized with at least a part of the plurality of audio data and has been transmitted thereto, said equipment comprising:

reception means for receiving the mail in which time information representing relative time relapsed from a time point when starting production of the mail is added to each of the plurality of drawing data;

audio reproducing means for reproducing successively the plurality of audio data contained in the mail received by said reception means; and drawing reproducing mean s for reproducing the drawing data, in order of reproduction, in which relative time elapsed from a time point when starting reproduction of the mail reaches the time represented by the time information added thereto, out of the plurality of drawing data contained in the mail received by said reception means, and discarding the drawing data, in which relative time elapsed from a time point when starting reproduction of the mail reaches the time represented by the time information added thereto, whenever predetermined time elapsed, out of the drawing data which is still unreproduced at the associated time point.

5. A mail terminal equipment according to claim 4, further comprising correction means for correcting the relative time elapsed from a time point when starting reproduction of the mail in correspondence to the total number of audio data reproduced by said audio reproducing means.

6. A mail t terminal equipment for receiving and reproducing a mail which has been produced using multi-media data containing a plurality of continuous audio data and a plurality of drawing data synchronized with at least a part of the plurality of audio data and has been transmitted thereto, said equipment comprising:

reception means for receiving the mail in which time information representing relative time elapsed from a time point when starting production of the mail is added to each of the plurality of drawing data;

audio reproducing means for reproducing successively the plurality of audio data contained in the mail received by said reception means; and drawing reproducing means for selecting some drawing data out of the plurality of drawing data contained in the mail received by said reception means, and reproducing the drawing data, in order of reproduction, in which relative time elapsed from a time point when starting reproduction of the mail reaches the time represented by the time information added thereto, out of the selected drawing data.

7. A mail terminal equipment according to claim 6, wherein said drawing reproducing means selects the drawing data, the number of which is within a predetermined limit value, whenever predetermined time elapsed.

8. A mail terminal equipment according to claim 6, further comprising correction means for correcting the relative time elapsed from a time point when starting reproduction of the mail in correspondence to the total number of audio data reproduced by said audio reproducing means.

9. A mail terminal equipment according to claim 7, wherein said drawing reproducing means selects the drawing data the number of which is within the predetermined limit value, whenever the predetermined time elapsed, the drawing data being combined so as for intervals of the drawing data to be uniform.

10. A mail terminal equipment according to claim 7, wherein said drawing reproducing means selects the drawing data the number of which is within the predetermined limit value, whenever the predetermined time elapsed, the drawing data being combined so as for a drawing locus after reproduction to be longer.

11. A mail terminal equipment according to claim 7, wherein said drawing reproducing means discards, whenever the predetermined time elapsed, out of the selected drawing data which is still unreproduced at the associated time point, the drawing data in which the relative time elapsed from a time point when starting reproduction of the mail reaches the time represented by the time information added thereto.

12. A mail terminal equipment according to claim 7, wherein said drawing reproducing means includes limit value changing means for changing dynamically the limit value.

13. A mail terminal equipment according to claim 11, wherein said drawing reproducing means includes limit value changing means for changing dynamically the limit value.

14. A mail terminal equipment according to claim 13, wherein said limit value changing means changes dynamically the limit value in correspondence to the number of drawing data discarded by said drawing reproducing means.

15. A mail terminal equipment according to claim 12, further comprising limit value setting means for setting a value inputted from the outside to the limit value.

16. A mail terminal equipment according to claim 12, further comprising limit value setting means for setting a value corresponding to its throughput or loading situation to the limit value.

17. A mail terminal equipment according to claim 12, further comprising limit value setting means for measuring, prior to reproduction of the mail, the number of drawing data which is reproducible within a predetermined time period using the drawing data for an examination previously prepared, and setting a value corresponding to the measurement results to the limit value.

18. A mail terminal equipment for receiving and reproducing a mail which has been produced using multi-media data containing a plurality of continuous audio data and a plurality of drawing data synchronized with at least a part of the plurality of audio data and has been transmitted thereto, said equipment comprising:

reception means for receiving the mail in which time information representing relative time elapsed from a time point when starting production of the mail is added to each of the plurality of drawing data;

audio reproducing means for reproducing successively the plurality of audio data contained in the mail received by said reception means; and drawing reproducing means for reproducing, when relative time elapsed from a time point when starting reproduction of the mail reaches time represented by the time information added to the drawing data of interest, the drawing data of interest if other drawing data is not being reproduced, and judging in correspondence to time density of the drawing data which is still unreproduced at that time point whether the drawing data of interest is reproduced or discarded if other drawing data is being reproduced, with respect to each of the plurality of drawing data contained in the mail received by said reception means.

19. A mail terminal equipment according to claim 18, further comprising correction means for correcting the relative time elapsed from a time point when starting reproduction of the mail in correspondence to the total number of audio data reproduced by said audio reproducing means.

20. A mail terminal equipment for receiving and reproducing a mail which has been produced using multi-media data containing a plurality of continuous audio data and a plurality of drawing data and has been transmitted thereto, said equipment comprising:

reception means for receiving, with certain time as a reference, the mail in which time information representing time elapsed from the reference time is added to each of the plurality of drawing data;

audio reproducing means for reproducing successively the plurality of audio data contained in the mail received by said reception means; and drawing reproducing means for reproducing the drawing data, in order of reproduction, in which a predetermined time relationship is obtained between the time elapsed from the reference time and the time information added to the drawing data, out of the plurality of drawing data contained in the mail received by said reception means.

21. A mail terminal equipment according to claim 20, wherein said drawing reproducing means selects the drawing data, the number of which is within a predetermined limiting value, whenever predetermined time elapsed, and out of the selected drawing data, reproduces the drawing data, in which the predetermined time relationship is obtained between the time elapsed from the reference time and the time information added to each of the drawing data, in order of reproduction.

22. A mail terminal equipment according to claim 20, wherein said drawing reproducing means includes correction means for correcting the time elapsed from the reference time in correspondence to the total number of audio data reproduced by said audio reproducing means.

23. A multi-media mail system in which a mail receiving-side terminal equipment and a mail transmitting-side terminal equipment for transmitting a mail to said mail receiving-side terminal equipment are connected to each other through a network, wherein said mail transmitting-side terminal equipment includes:

audio input means for inputting successively a plurality of continuous audio data;

drawing input means for inputting successively a plurality of drawing data which are synchronized with at least a part of the audio data inputted by said audio input means;

time information adding means for adding time information representing, with certain time as a reference, time elapsed from the reference time to each of the plurality of drawing data inputted by said drawing input means; and transmission means for transmitting, as the mail, multi-media data containing the plurality of audio data inputted by said audio input means, and the plurality of drawing data to each of which the time information is added by said time information adding means through said network, and said mail receiving-side terminal equipment includes:

reception means for receiving the mail in which the time information representing, with the certain time as the reference, time elapsed from the reference time is added to each of the plurality of drawing data;

audio reproducing means for reproducing successively the plurality of audio data contained in the mail received by said reception means; and drawing reproducing means for reproducing, in order of reproduction, the drawing data, in which the time elapsed from the reference time has, with the time information added to each of the drawing data, a predetermined time relationship, out of the plurality of drawing data contained in the mail received by said reception means.

24. A multi-media mail system according to claim 23, wherein said drawing reproducing means of said mail terminal equipment selects the drawing data, the number of which is within a predetermined limiting value, whenever predetermined time elapsed, and out of the selected drawing data, reproduces the drawing data, in which the predetermined time relationship is obtained between the time elapsed from the reference time and the time information added to each of the drawing data, in order of reproduction.

25. A multi-media mail system according to claim 23, wherein said drawing reproducing means includes correction means for correcting the time elapsed from the reference time in correspondence to the total number of audio data reproduced by said audio reproducing means.

26. A multi-media mail system in which a plurality of mail terminal equipments are provided, and the plurality of mail terminal equipment are connected to one another through a network, wherein each of said plurality of mail terminal equipments includes:

audio input means for inputting successively a plurality of continuous audio data;

drawing input means for inputting successively a plurality of drawing data which are synchronized with at least a part of the audio data inputted by said audio input means;

time information adding means for adding time information representing, with certain time as a reference, time elapsed from the reference time to each of the plurality of drawing data inputted by said drawing input means;

transmission means for transmitting, as the mail, multi-media data containing the plurality of audio data inputted by said audio input means, and the plurality of drawing data to each of which the time information is added by said time information adding means through said network;

reception means for receiving the mail, in which the time information representing, with the certain time as the reference, time elapsed from the reference time is added to each of the plurality of drawing data, from another mail terminal equipment;

audio reproducing means for reproducing successively the plurality of audio data contained in the mail received by said reception means; and drawing reproducing means for reproducing, in order of reproduction, the drawing data, in which the time elapsed from the reference time has, with the time information added to each of the drawing data, a predetermined time relationship, out of the plurality of drawing data contained in the mail received by said reception means.

27. A multi-media mail system according to claim 26, wherein said drawing reproducing means of said mail terminal equipment selects the drawing data, the number of which is within a predetermined limit value, whenever predetermined time elapsed, and out of the selected drawing data, reproduces the drawing data, in which the predetermined time relationship is obtained between the time elapsed from the reference time and the time information added to each of the drawing data, in order of reproduction.

28. A multi-media mail system according to claim 26, wherein said drawing reproducing means includes correction means for correcting the time elapsed from the reference time in correspondence to the total number of audio data reproduced by said audio reproducing means.

29. A mail reproducing method of receiving a mail which has been produced using multi-media data containing a plurality of continuous audio data and a plurality of drawing data, and has been transmitted thereto, said method comprising the steps of:

receiving, with certain time as a reference, the mail in which time information representing time elapsed from the reference time is added to each of the plurality of drawing data;

reproducing successively the plurality of audio data contained in the mail which has been received; and reproducing the drawing data, in order of reproduction, in which a predetermined time relationship is obtained between the time elapsed from the reference time and the time information added to the drawing data, out of the plurality of drawing data contained in the mail which has been received.

30. A mail reproducing method according to claim 29, wherein the drawing data the number of which is within a predetermined limiting value is selected whenever predetermined time elapsed, and out of the selected drawing data, the drawing data in which the predetermined time relationship is obtained between the time elapsed from the reference time and the time information added to each of the drawing data is reproduced in order of reproduction.

31. A mail reproducing method according to claim 29, wherein the time elapsed from the reference time is corrected in correspondence to the total number of audio data reproduced in said audio reproducing step.

32. A multi-media mail system in which a mail receiving-side terminal equipment and mail transmitting-side terminal equipment for transmitting-side a mail to said mail terminal equipment are connected to each other through a network, wherein said mail transmitting terminal equipment inputs successively a plurality of continuous audio data and also inputs successively a plurality of drawing data which synchronize with at least a part of the audio data;

adds time information representing, with certain time as a reference, time elapsed from the reference time to each of the plurality of drawing data thus inputted; and transmits, as the mail, multi-media data containing the plurality of audio data and the plurality of drawing data to each of which the time information is added, through said network, and said mail receiving-side terminal equipment receives the mail in which the time information representing, with the certain time as the reference, time elapsed from the reference time is added to each of the plurality of drawing data;

reproduces successively the plurality of audio data contained in the mail which has been received; and reproduces, in order of reproduction, the drawing data, in which the time elapsed from the reference time has, with the time information added to each of the drawing data, a predetermined time relationship, out of the plurality of drawing data contained in the mail which has been received.

33. A method of transmitting/receiving a multi-media mail according to claim 32, wherein said mail terminal equipment selects the drawing data, the number of which is within a predetermined limiting value, whenever predetermined time elapsed, and out of the selected drawing data, reproduces the drawing data, in which the predetermined time relationship is obtained between the time elapsed from the reference time and the time information added to each of the drawing data, in order of reproduction.

34. A method of transmitting/receiving a multi-media mail according to claim 32, wherein the time elapsed from the reference time is corrected in correspondence to the total number of audio data reproduced by said mail terminal equipment.

35. For use in a multi-media mail system in which a plurality of mail terminal equipments are provided and the plurality of mail terminal equipments are connected to one another through a network, a method of transmitting/receiving a multi-media mail in each of said mail terminal equipments comprising the steps:

in a transmission mode inputting successively a plurality of continuous audio data and also inputs successively a plurality of drawing data which synchronizes with at least a part of the audio data;

adding time information representing, with certain time as a reference, time elapsed from the reference time to each of the plurality of drawing data thus inputted;

transmitting, as the mail, multi-media data containing the plurality of audio data and the plurality of drawing data to each of which the time information is added, through said network;

in a receiving mode, receiving the mail in which the time information representing, with the certain time as the reference, time elapsed from the reference time is added to each of the plurality of drawing data;

reproducing successively the plurality of audio data contained in the mail which has been received; and reproducing, in order of reproduction, the drawing data, in which the time elapsed from the reference time has, with the time information added to each of the drawing data, a predetermined time relationship, out of the plurality of drawing data contained in the mail which has been received.

36. A method of transmitting/receiving a multi-media mail according to claim 35, wherein said mail terminal equipment selects the drawing data, the number of which is within a predetermined limiting value, whenever predetermined time elapsed, and out of the selected drawing data, reproduces the drawing data, in which the predetermined time relationship is obtained between the time elapsed from the reference time and the time information added to each of the drawing data, in order of reproduction.

37. A method of transmitting/receiving a multi-media mail according to claim 35, wherein the time elapsed from the reference time is corrected in correspondence to the total number of audio data reproduced by said mail terminal equipment.

38. A processor readable storage medium for storing therein program code for causing a computer to receive and reproduce in a receiving-side mail terminal a mail which has been produced using multi-media data containing a plurality of continuous audio data and a plurality of drawing data and has been transmitted thereto, comprising:

first program code means for receiving with certain time as a reference, the mail in which time information representing time elapsed from the reference time is added to each of the plurality of drawing data;

second program code means for reproducing successively the plurality of audio data contained in the mail which has been received; and third program code means for reproducing the drawing data, in order of reproduction, in which a predetermined time relationship is obtained between the time elapsed from the reference time and the time information added to the drawing data, out of the plurality of drawing data contained in the mail which has been received.

39. A storage medium according to claim 38, is further comprising fourth program code means for selecting the drawing data, the number of which is within a predetermined limit value, whenever predetermined time elapsed, and out of the selected drawing data, and fifth program code means for reproducing the drawing data, in which the predetermined time relationship is obtained between the time elapsed from the reference time and the time information added to each of the drawing data, in order of reproduction.

40. A storage medium according to claim 38, wherein further comprising sixth program code means for connecting the time elapsed from the reference time in correspondence to the total number of audio data reproduced by said second program code means.

41. A computer-readable storage for directing on the computer the operation of a multi-media mail system in which a mail terminal equipment and mail transmitting terminal equipment for transmitting a mail to said mail terminal equipment are connected to each other through a network, said storage comprising:

for said mail transmitting terminal equipment, means for inputting successively a plurality of continuous audio data and also inputs successively a plurality of drawing data which synchronizes with at least a part of the audio data;

means for adding time information representing, with certain time as a reference, time elapsed from the reference time to each of the plurality of drawing data thus inputted; and means for transmitting, as the mail, multimedia data containing the plurality of audio data and the plurality of drawing data to each of which the time information is added, through said network, and for said mail terminal equipment means for receiving the mail in which the time information representing, with the certain time as the reference, time elapsed from the reference time is added to each of the plurality of drawing data;

means for reproducing successively the plurality of audio data contained in the mail which has been received; and means for reproducing, in order of reproduction, the drawing data, in which the time elapsed from the reference time has, with the time information added to each of the drawing data, a predetermined time relationship, out of the plurality of drawing data contained in the mail which has been received.

42. A storage medium according to claim 41, further comprising means for carrying out the control in such a way that said mail terminal equipment selects the drawing data, the number of which is within a predetermined limit value, whenever predetermined time elapsed, and out of the selected drawing data, and means for reproducing the drawing data, in which the predetermined time relationship is obtained between the time elapsed from the reference time and the time information added to each of the drawing data, in order of reproduction.

43. A storage medium according to claim 41, further comprising means for carrying out the control in such a way that the time elapsed from the reference time is corrected in correspondence to the total number of audio data reproduced by said mail terminal equipment.

44. A computer readable storage medium for directing on the computer the operation of a multi-media mail system in which a plurality of mail terminal equipment is provided and the plurality of mail terminal equipments are connected to one another through a network, said storage medium comprising:

for each of said mail terminal equipment means for inputting successively a plurality of continuous audio data and also inputs successively a plurality of drawing data which synchronizes with at least a part of the audio data;

means for adding time information representing, with certain time as a reference, time elapsed from the reference time to each of the plurality of drawing data thus inputted;

means for transmitting, as the mail, multi-media data containing the plurality of audio data and the plurality of drawing data to each of which the time information is added, through said network;

means for receiving the mail in which the time information representing, with the certain time as the reference, time elapsed from the reference time is added to each of the plurality of drawing data;

means for reproducing successively the plurality of audio data contained in the mail which has been received; and means for reproducing, in order of reproduction, the drawing data, in which the time elapsed from the reference time has, with the time information added to each of the drawing data, a predetermined time relationship, out of the plurality of drawing data contained in the mail which has been received.

45. A storage medium according to claim 44, further comprising means for carrying out the control in such a way that said mail terminal equipment selects the drawing data, the number of which is within a predetermined limiting value, whenever predetermined time elapsed, and out of the selected drawing data, and means for reproducing the drawing data, in which the predetermined time relationship is obtained between the time elapsed from the reference time and the time information added to each of the drawing data, in order of reproduction.

46. A storage medium according to claim 44, further comprising means for carrying out the control in such a way that the time elapsed from the reference time is corrected in correspondence to the total number of audio data reproduced by said mail terminal equipment.

* * * * *